United States Patent
Murphy et al.

(10) Patent No.: US 12,063,501 B2
(45) Date of Patent: *Aug. 13, 2024

(54) AP-LOCAL DYNAMIC SWITCHING

(71) Applicant: Juniper Networks, Inc., Sunnyvale, CA (US)

(72) Inventors: James Murphy, Pleasanton, CA (US); Gary E. Morain, San Jose, CA (US); Stan Chesnutt, Berkeley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,334

(22) Filed: Apr. 7, 2023

(65) Prior Publication Data

US 2023/0247424 A1 Aug. 3, 2023

Related U.S. Application Data

(63) Continuation of application No. 17/012,990, filed on Sep. 4, 2020, now Pat. No. 11,627,461, which is a
(Continued)

(51) Int. Cl.
*H04L 12/721* (2013.01)
*H04W 4/06* (2009.01)
(Continued)

(52) U.S. Cl.
CPC ............. *H04W 12/06* (2013.01); *H04W 4/06* (2013.01); *H04W 36/08* (2013.01); *H04W 40/02* (2013.01);
(Continued)

(58) Field of Classification Search
None
See application file for complete search history.

(56) References Cited

U.S. PATENT DOCUMENTS

| 3,246,751 A | 4/1966 | William et al. |
| 3,249,252 A | 5/1966 | Smith |

(Continued)

FOREIGN PATENT DOCUMENTS

| EP | 0992921 A2 | 4/2000 |
| EP | 1542409 A | 6/2005 |

(Continued)

OTHER PUBLICATIONS

3COM, Wireless LAN Mobility System: Wireless LAN Switch and Controller Configuration Guide, 3COM, Revision A, Oct. 2004, 476 pages.
(Continued)

*Primary Examiner* — Scott M Sciacca
(74) *Attorney, Agent, or Firm* — Shumaker & Sieffert, P.A.

(57) ABSTRACT

A technique for implementing AP-local dynamic switching involves Layer 2 switching. This may be accomplished by providing data associated with wireless stations to an AP sufficient to enable the AP to determine whether traffic from a particular wireless station should be locally switched. Alternatively, the wireless station may be able to determine whether to locally switch traffic based upon the traffic itself. For example, it may be desirable to AP-locally switch voice traffic to avoid latency, which is particularly detrimental to voice transmissions such as voiceover-IP. Traffic that is not to be switched locally is Layer 2 tunneled upstream.

20 Claims, 8 Drawing Sheets

Related U.S. Application Data continuation of application No. 16/401,904, filed on May 2, 2019, now Pat. No. 10,798,650, which is a continuation of application No. 15/803,208, filed on Nov. 3, 2017, now Pat. No. 10,327,202, which is a continuation of application No. 14/996,088, filed on Jan. 14, 2016, now Pat. No. 9,838,942, which is a continuation of application No. 12/304,100, filed as application No. PCT/US2007/013757 on Jun. 11, 2007, now Pat. No. 9,258,702, which is a continuation-in-part of application No. 11/801,964, filed on May 11, 2007, now Pat. No. 8,818,322.

(60) Provisional application No. 60/812,403, filed on Jun. 9, 2006.

(51) Int. Cl.
| | | |
|---|---|---|
| *H04W 12/06* | (2021.01) | |
| *H04W 36/08* | (2009.01) | |
| *H04W 40/02* | (2009.01) | |
| *H04W 48/20* | (2009.01) | |
| *H04W 72/044* | (2023.01) | |
| *H04W 76/11* | (2018.01) | |
| *H04W 76/12* | (2018.01) | |
| *H04W 84/22* | (2009.01) | |
| *H04W 8/08* | (2009.01) | |
| *H04W 80/02* | (2009.01) | |
| *H04W 84/18* | (2009.01) | |
| *H04W 88/14* | (2009.01) | |

(52) U.S. Cl.
CPC ......... *H04W 48/20* (2013.01); *H04W 72/046* (2013.01); *H04W 76/11* (2018.02); *H04W 76/12* (2018.02); *H04W 84/22* (2013.01); *H04W 8/082* (2013.01); *H04W 80/02* (2013.01); *H04W 84/18* (2013.01); *H04W 88/14* (2013.01)

(56) References Cited

U.S. PATENT DOCUMENTS

| | | |
|---|---|---|
| 3,256,300 A | 6/1966 | Wygant et al. |
| 3,256,334 A | 6/1966 | Scheidt |
| 3,262,988 A | 7/1966 | Joyce |
| 3,285,662 A | 11/1966 | Armin |
| 3,304,906 A | 2/1967 | Nance |
| 3,336,035 A | 8/1967 | Price |
| 3,356,758 A | 12/1967 | Omietanski et al. |
| 3,404,772 A | 10/1968 | Ernst |
| 3,496,290 A | 2/1970 | Smith |
| 3,564,380 A | 2/1971 | Zeldman |
| 3,567,416 A | 3/1971 | Stilley et al. |
| 3,636,524 A | 1/1972 | Holland |
| 3,641,433 A | 2/1972 | Mifflin et al. |
| 3,661,787 A | 5/1972 | Brown, Jr. |
| 3,674,403 A | 7/1972 | Jonsson et al. |
| 3,697,415 A | 10/1972 | Seitzer |
| 3,721,334 A | 3/1973 | Jarema |
| 3,785,275 A | 1/1974 | Keats et al. |
| 3,839,348 A | 10/1974 | Worth |
| 3,906,166 A | 9/1975 | Cooper et al. |
| 3,934,260 A | 1/1976 | Kasami et al. |
| 3,937,566 A | 2/1976 | Townsley |
| 3,973,622 A | 8/1976 | Laing |
| 3,993,683 A | 11/1976 | Nickl |
| 4,168,400 A | 9/1979 | De Couasnon et al. |
| 4,176,316 A | 11/1979 | DeRosa et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,073,075 A | 12/1991 | Duran |
| 5,088,591 A | 2/1992 | Grecksch et al. |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 8/1992 | Dent |
| 5,157,687 A | 10/1992 | Tymes |
| 5,187,575 A | 2/1993 | Dent et al. |
| 5,231,633 A | 7/1993 | Hluchyj et al. |
| 5,240,083 A | 8/1993 | Lyon |
| 5,259,405 A | 11/1993 | Hua-Chou |
| 5,280,498 A | 1/1994 | Tymes et al. |
| 5,285,494 A | 2/1994 | Sprecher et al. |
| 5,304,596 A | 4/1994 | Moriya et al. |
| 5,326,918 A | 7/1994 | Correia et al. |
| 5,327,144 A | 7/1994 | Stilp et al. |
| 5,329,531 A | 7/1994 | Diepstraten |
| 5,339,316 A | 8/1994 | Diepstraten |
| 5,347,091 A | 9/1994 | Schroeder |
| 5,371,783 A | 12/1994 | Rose et al. |
| 5,397,040 A | 3/1995 | Lee |
| 5,418,812 A | 5/1995 | Reyes et al. |
| 5,432,842 A | 7/1995 | Kinoshita |
| 5,444,851 A | 8/1995 | Woest |
| 5,448,569 A | 9/1995 | Huang et al. |
| 5,450,615 A | 9/1995 | Fortune et al. |
| 5,465,401 A | 12/1995 | Thompson |
| 5,479,441 A | 12/1995 | Tymes et al. |
| 5,483,676 A | 1/1996 | Mahany et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,570,867 A | 11/1996 | Norkus |
| 5,574,240 A | 11/1996 | Cartwright |
| 5,584,048 A | 12/1996 | Wieczorek |
| 5,598,532 A | 1/1997 | Liron |
| 5,614,787 A | 3/1997 | Kawai et al. |
| 5,630,207 A | 5/1997 | Gitlin et al. |
| 5,640,414 A | 6/1997 | Blakeney et al. |

(56) References Cited

U.S. PATENT DOCUMENTS

| | | |
|---|---|---|
| 5,649,289 A | 7/1997 | Wang et al. |
| 5,658,389 A | 8/1997 | Matsuda et al. |
| 5,668,803 A | 9/1997 | Tymes et al. |
| 5,670,964 A | 9/1997 | Dent |
| 5,677,894 A | 10/1997 | Erath |
| 5,677,954 A | 10/1997 | Hirata et al. |
| 5,678,802 A | 10/1997 | Lunder |
| 5,706,428 A | 1/1998 | Boer et al. |
| 5,715,304 A | 2/1998 | Nishida et al. |
| 5,725,260 A | 3/1998 | Eikmeier et al. |
| 5,729,542 A | 3/1998 | Dupont |
| 5,734,699 A | 3/1998 | Lu et al. |
| 5,738,629 A | 4/1998 | Moll et al. |
| 5,740,533 A | 4/1998 | Lin |
| 5,742,592 A | 4/1998 | Scholefield et al. |
| 5,745,481 A | 4/1998 | Phillips et al. |
| 5,756,940 A | 5/1998 | Van Driel et al. |
| 5,760,324 A | 6/1998 | Wakuda et al. |
| 5,774,460 A | 6/1998 | Schiffel et al. |
| 5,793,303 A | 8/1998 | Koga |
| 5,794,128 A | 8/1998 | Brockel et al. |
| 5,798,788 A | 8/1998 | Meehan et al. |
| 5,812,589 A | 9/1998 | Sealander et al. |
| 5,815,811 A | 9/1998 | Pinard et al. |
| 5,818,385 A | 10/1998 | Bartholomew |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,847,620 A | 12/1998 | Wong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,959,546 A | 9/1999 | Dorenbosch |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,990,348 A | 11/1999 | Lyons et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright |
| 6,088,591 A | 7/2000 | Trompower |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,130,896 A | 10/2000 | Lueker |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Fine et al. |
| 6,199,032 B1 | 3/2001 | Anderson |
| 6,208,629 B1 | 3/2001 | Jaszewki et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watannabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,397,040 B1 | 5/2002 | Titmuss et al. |
| 6,400,722 B1 | 6/2002 | Chuah et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,487,604 B1 | 11/2002 | Rochford et al. |
| 6,490,443 B1 | 12/2002 | Freeny, Jr. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | Mcintosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,570,867 B1 | 5/2003 | Robinson et al. |
| 6,574,240 B1 | 6/2003 | Tzeng |
| 6,580,700 B1 | 6/2003 | Pinard et al. |
| 6,584,494 B1 | 6/2003 | Manabe et al. |
| 6,587,604 B2 | 7/2003 | Yamauchi |
| 6,587,680 B1 | 7/2003 | Ata-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,636,524 B1 | 10/2003 | Chen et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,661,787 B1 | 12/2003 | O'Connell et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,721,548 B1 | 4/2004 | Mohindra et al. |
| 6,725,260 B1 | 4/2004 | Philyaw |
| 6,738,629 B1 | 5/2004 | McCormick et al. |
| 6,745,333 B1 | 6/2004 | Thomsen |
| 6,747,961 B1 | 6/2004 | Ahmed et al. |
| 6,756,940 B2 | 6/2004 | Oh et al. |

(56) References Cited

U.S. PATENT DOCUMENTS

| | | |
|---|---|---|
| 6,760,324 B1 | 7/2004 | Scott et al. |
| 6,785,275 B1 | 8/2004 | Boivie et al. |
| 6,788,938 B1 | 9/2004 | Sugaya et al. |
| 6,795,421 B1 | 9/2004 | Heinonen et al. |
| 6,798,788 B1 | 9/2004 | Viswanath et al. |
| 6,801,782 B2 | 10/2004 | McCrady et al. |
| 6,826,399 B1 | 11/2004 | Hoffman et al. |
| 6,839,338 B1 | 1/2005 | Amara et al. |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 | 2/2005 | Henry et al. |
| 6,865,609 B1 | 3/2005 | Gubbi et al. |
| 6,879,812 B2 | 4/2005 | Aarawal et al. |
| 6,901,439 B1 | 5/2005 | Bonasia et al. |
| 6,917,688 B2 | 7/2005 | Yu et al. |
| 6,934,260 B1 | 8/2005 | Kanuri |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B2 | 1/2006 | Leung |
| 6,985,697 B2 | 1/2006 | Smith et al. |
| 6,990,348 B1 | 1/2006 | Benveniste |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. |
| 7,024,199 B1 | 4/2006 | Massie et al. |
| 7,024,394 B1 | 4/2006 | Ashour et al. |
| 7,027,773 B1 | 4/2006 | McMillin |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. |
| 7,068,999 B2 | 6/2006 | Ballai |
| 7,079,537 B1 | 7/2006 | Kanuri et al. |
| 7,089,322 B1 | 8/2006 | Stallman |
| 7,092,529 B2 | 8/2006 | Yu et al. |
| 7,110,756 B2 | 9/2006 | Diener |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B1 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow |
| 7,158,777 B2 | 1/2007 | Lee et al. |
| 7,159,016 B2 | 1/2007 | Baker |
| 7,167,718 B2 | 1/2007 | Hayashi et al. |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,269,155 B2 | 9/2007 | Joshi |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,313,111 B2 | 12/2007 | Hietalahti et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,336,961 B1 | 2/2008 | Ngan |
| 7,349,412 B1 | 3/2008 | Jones et al. |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 | 5/2008 | Caves et al. |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,441,043 B1 | 10/2008 | Henry et al. |
| 7,443,823 B2 | 10/2008 | Hunkeler et al. |
| 7,447,217 B2 | 11/2008 | Knaebchen |
| 7,447,502 B2 | 11/2008 | Buckley |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 | 1/2009 | Sinha |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,519,372 B2 | 4/2009 | MacDonald et al. |
| 7,525,215 B2 | 4/2009 | Keenly et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |
| 7,587,750 B2 | 9/2009 | Zimmer et al. |
| 7,592,906 B1 | 9/2009 | Hanna et al. |
| 7,603,119 B1 | 10/2009 | Durig et al. |
| 7,603,710 B2 | 10/2009 | Harvey et al. |
| 7,633,909 B1 | 12/2009 | Jones |
| 7,636,363 B2 | 12/2009 | Chang et al. |
| 7,665,132 B2 | 2/2010 | Hisada et al. |
| 7,680,501 B2 | 3/2010 | Sillasto et al. |
| 7,685,295 B2 | 3/2010 | Myers et al. |
| 7,693,526 B2 | 4/2010 | Qian et al. |
| 7,697,516 B2 | 4/2010 | Frei |
| 7,706,749 B2 | 4/2010 | Ritala |
| 7,715,432 B2 | 5/2010 | Bennett |
| 7,716,379 B2 | 5/2010 | Ruan et al. |
| 7,724,703 B2 | 5/2010 | Matta et al. |
| 7,724,704 B2 | 5/2010 | Simons et al. |
| 7,729,278 B2 | 6/2010 | Chari et al. |
| 7,733,868 B2 | 6/2010 | Van Zijst |
| 7,738,433 B2 | 6/2010 | Tao |
| 7,746,897 B2 | 6/2010 | Stephenson et al. |
| 7,788,475 B2 | 8/2010 | Zimmer et al. |
| 7,805,529 B2 | 9/2010 | Galluzzo et al. |
| 7,817,554 B2 | 10/2010 | Skog et al. |
| 7,844,298 B2 | 11/2010 | Riley |
| 7,856,659 B2 | 12/2010 | Keeler et al. |
| 7,865,713 B2 | 1/2011 | Chesnutt et al. |
| 7,873,061 B2 | 1/2011 | Gast et al. |
| 7,876,704 B1 | 1/2011 | Bims |
| 7,894,852 B2 | 2/2011 | Hansen |
| 7,912,982 B2 | 3/2011 | Murphy |
| 7,920,548 B2 | 4/2011 | Lor et al. |
| 7,929,922 B2 | 4/2011 | Kubo |
| 7,945,399 B2 | 5/2011 | Nosovitsky et al. |
| 7,958,953 B2 | 6/2011 | Chafai |
| 7,986,940 B2 | 7/2011 | Lee et al. |
| 8,000,724 B1 | 8/2011 | Rayburn et al. |
| 8,014,404 B2 | 9/2011 | Eki et al. |
| 8,019,082 B1 | 9/2011 | Wiedmann et al. |
| 8,019,352 B2 | 9/2011 | Rappaport et al. |
| 8,072,952 B2 | 12/2011 | Aragon et al. |
| 8,116,275 B2 | 2/2012 | Matta et al. |
| 8,140,845 B2 | 3/2012 | Buddhikot et al. |
| 8,150,357 B2 | 4/2012 | Aragon |
| 8,161,278 B2 | 4/2012 | Harkins |
| 8,189,600 B2 | 5/2012 | Jabr et al. |

(56) References Cited

U.S. PATENT DOCUMENTS

| | | |
|---|---|---|
| 8,190,750 B2 | 5/2012 | Balachandran et al. |
| 8,238,942 B2 | 8/2012 | Gast |
| 8,270,384 B2 | 9/2012 | Cheng et al. |
| 8,340,110 B2 | 12/2012 | Gast |
| 8,457,031 B2 | 6/2013 | Matta |
| 8,509,128 B2 | 8/2013 | Gast |
| 8,514,827 B2 | 8/2013 | Matta et al. |
| 8,542,836 B2 | 9/2013 | Pochop |
| 8,594,606 B2 | 11/2013 | Aragon |
| 8,594,697 B2 | 11/2013 | Aragon |
| 8,635,444 B2 | 1/2014 | Harkins |
| 8,638,762 B2 | 1/2014 | Tiwari |
| 8,804,732 B1 | 8/2014 | Hepting et al. |
| 8,818,322 B2 | 8/2014 | Murphy et al. |
| 8,902,904 B2 | 12/2014 | Gast et al. |
| 9,043,792 B1 | 5/2015 | Xu |
| 9,232,451 B2 | 1/2016 | Murphy |
| 9,258,702 B2 | 2/2016 | Murphy |
| 9,838,942 B2 | 12/2017 | Murphy et al. |
| 10,007,567 B2 | 6/2018 | Zhang et al. |
| 10,024,953 B2 | 7/2018 | Johnson et al. |
| 10,327,202 B2 | 6/2019 | Murphy et al. |
| 10,798,650 B2 | 10/2020 | Murphy et al. |
| 10,834,585 B2 | 11/2020 | Murphy et al. |
| 11,432,147 B2 | 8/2022 | Murphy et al. |
| 2001/0007567 A1 | 7/2001 | Ando et al. |
| 2001/0024953 A1 | 9/2001 | Balogh |
| 2002/0021701 A1 | 2/2002 | Lavian et al. |
| 2002/0052205 A1 | 5/2002 | Belostofsky et al. |
| 2002/0060995 A1 | 5/2002 | Cervello et al. |
| 2002/0062384 A1 | 5/2002 | Tso |
| 2002/0069278 A1 | 6/2002 | Forslow |
| 2002/0078361 A1 | 6/2002 | Giroux et al. |
| 2002/0080790 A1 | 6/2002 | Beshai |
| 2002/0082913 A1 | 6/2002 | Li |
| 2002/0083316 A1 | 6/2002 | Platenberg et al. |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0107023 A1 | 8/2002 | Chari et al. |
| 2002/0116655 A1 | 8/2002 | Lew et al. |
| 2002/0157020 A1 | 10/2002 | Royer |
| 2002/0174137 A1 | 11/2002 | Wolff et al. |
| 2002/0174364 A1 | 11/2002 | Nordman et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018889 A1 | 1/2003 | Burnett et al. |
| 2003/0036350 A1 | 2/2003 | Jonsson et al. |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120763 A1 | 6/2003 | Volpano |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0145081 A1 | 7/2003 | Lau et al. |
| 2003/0149787 A1 | 8/2003 | Mangan |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0223383 A1 | 12/2003 | Chang |
| 2003/0227934 A1 | 12/2003 | White et al. |
| 2004/0001467 A1 | 1/2004 | Cromer et al. |
| 2004/0002343 A1 | 1/2004 | Brauel et al. |
| 2004/0003285 A1 | 1/2004 | Whelan et al. |
| 2004/0008652 A1 | 1/2004 | Tanzella et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0030931 A1 | 2/2004 | Chamandy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0049699 A1 | 3/2004 | Griffith et al. |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062224 A1 | 4/2004 | Brownrigg et al. |
| 2004/0062267 A1 | 4/2004 | Minami et al. |
| 2004/0064560 A1 | 4/2004 | Zhang et al. |
| 2004/0064591 A1 | 4/2004 | Noble |
| 2004/0066756 A1 | 4/2004 | Ahmavaara et al. |
| 2004/0066757 A1 | 4/2004 | Molteni et al. |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0097232 A1 | 5/2004 | Haverinen |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0132438 A1 | 7/2004 | White |
| 2004/0141511 A1 | 7/2004 | Rune et al. |
| 2004/0143428 A1 | 7/2004 | Rappaport et al. |
| 2004/0143755 A1 | 7/2004 | Whitaker et al. |
| 2004/0151193 A1 | 8/2004 | Rune et al. |
| 2004/0156384 A1 | 8/2004 | Rune et al. |
| 2004/0156399 A1 | 8/2004 | Eran |
| 2004/0165545 A1 | 8/2004 | Cook |
| 2004/0174900 A1 | 9/2004 | Volpi et al. |
| 2004/0184475 A1 | 9/2004 | Meier |
| 2004/0193709 A1 | 9/2004 | Selvaggi et al. |
| 2004/0208570 A1 | 10/2004 | Reader |
| 2004/0214572 A1 | 10/2004 | Thompson et al. |
| 2004/0215665 A1 | 10/2004 | Edgar et al. |
| 2004/0221042 A1 | 11/2004 | Meier |
| 2004/0228319 A1 | 11/2004 | Melville et al. |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0236851 A1 | 11/2004 | Kuan et al. |
| 2004/0242250 A1 | 12/2004 | Sasai et al. |
| 2004/0246937 A1 | 12/2004 | Duong et al. |
| 2004/0246962 A1 | 12/2004 | Kopeikin et al. |
| 2004/0252656 A1 | 12/2004 | Shiu et al. |
| 2004/0253969 A1 | 12/2004 | Nguyen et al. |
| 2004/0255167 A1 | 12/2004 | Knight |
| 2004/0259542 A1 | 12/2004 | Viitamaki et al. |
| 2004/0259552 A1 | 12/2004 | Ihori et al. |
| 2004/0259555 A1 | 12/2004 | Rappaport et al. |
| 2004/0259575 A1 | 12/2004 | Perez-Breva et al. |
| 2004/0268140 A1 | 12/2004 | Zimmer et al. |
| 2005/0009565 A1 | 1/2005 | Kwak |
| 2005/0010811 A1 | 1/2005 | Zimmer et al. |
| 2005/0015592 A1 | 1/2005 | Lin |
| 2005/0020284 A1 | 1/2005 | Benco et al. |
| 2005/0021979 A1 | 1/2005 | Wiedmann et al. |
| 2005/0025103 A1 | 2/2005 | Ko et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037733 A1 | 2/2005 | Coleman et al. |
| 2005/0037818 A1 | 2/2005 | Seshadri et al. |
| 2005/0040968 A1 | 2/2005 | Damarla et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |

(56) References Cited

U.S. PATENT DOCUMENTS

| | | |
|---|---|---|
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0147060 A1 | 7/2005 | Buckley |
| 2005/0148326 A1 | 7/2005 | Nogawa et al. |
| 2005/0154933 A1 | 7/2005 | Hsu et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0166072 A1 | 7/2005 | Converse et al. |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0180367 A1 | 8/2005 | Dooley et al. |
| 2005/0181805 A1 | 8/2005 | Gallagher |
| 2005/0190714 A1 | 9/2005 | Gorbatov et al. |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0250487 A1 | 11/2005 | Miwa et al. |
| 2005/0256963 A1 | 11/2005 | Proctor, Jr. et al. |
| 2005/0259597 A1 | 11/2005 | Benedetotto et al. |
| 2005/0259611 A1 | 11/2005 | Bhagwat et al. |
| 2005/0259654 A1 | 11/2005 | Faulk, Jr. |
| 2005/0268335 A1 | 12/2005 | Le et al. |
| 2005/0270992 A1 | 12/2005 | Sanzgiri et al. |
| 2005/0273442 A1 | 12/2005 | Bennett et al. |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floras et al. |
| 2006/0046744 A1 | 3/2006 | Dublish et al. |
| 2006/0050742 A1 | 3/2006 | Grandhi et al. |
| 2006/0062187 A1 | 3/2006 | Rune |
| 2006/0064480 A1 | 3/2006 | Lesartre et al. |
| 2006/0068702 A1 | 3/2006 | Miwa et al. |
| 2006/0072532 A1 | 4/2006 | Dorenbosch et al. |
| 2006/0073847 A1 | 4/2006 | Pirzada et al. |
| 2006/0092845 A1* | 5/2006 | Kwan ............... H04L 47/50 370/235 |
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0104231 A1 | 5/2006 | Gidwani |
| 2006/0114872 A1 | 6/2006 | Hamada |
| 2006/0114938 A1 | 6/2006 | Kalkunte et al. |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0143702 A1 | 6/2006 | Hisada et al. |
| 2006/0146748 A1 | 7/2006 | Ng et al. |
| 2006/0152344 A1 | 7/2006 | Mowery |
| 2006/0153122 A1 | 7/2006 | Hinman et al. |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0166699 A1 | 7/2006 | Aghvami et al. |
| 2006/0168383 A1 | 7/2006 | Lin |
| 2006/0173844 A1 | 8/2006 | Zhang et al. |
| 2006/0174336 A1 | 8/2006 | Chen |
| 2006/0178168 A1 | 8/2006 | Roach |
| 2006/0182118 A1 | 8/2006 | Lam et al. |
| 2006/0187878 A1 | 8/2006 | Calhoun et al. |
| 2006/0189311 A1 | 8/2006 | Cromer et al. |
| 2006/0190721 A1 | 8/2006 | Kawakami et al. |
| 2006/0193258 A1 | 8/2006 | Ballai |
| 2006/0200563 A1 | 9/2006 | Hirose |
| 2006/0200862 A1 | 9/2006 | Olson et al. |
| 2006/0206582 A1 | 9/2006 | Finn |
| 2006/0215601 A1 | 9/2006 | Vieugels et al. |
| 2006/0217131 A1 | 9/2006 | Alizadeh-Shabdiz et al. |
| 2006/0223527 A1 | 10/2006 | Lee et al. |
| 2006/0245393 A1 | 11/2006 | Bajic |
| 2006/0248229 A1 | 11/2006 | Saunderson et al. |
| 2006/0251021 A1 | 11/2006 | Nakano et al. |
| 2006/0268696 A1 | 11/2006 | Konstantinov et al. |
| 2006/0268749 A1 | 11/2006 | Rahman et al. |
| 2006/0268756 A1 | 11/2006 | Wang et al. |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0286984 A1 | 12/2006 | Bonner |
| 2006/0292992 A1 | 12/2006 | Tajima et al. |
| 2007/0002742 A1 | 1/2007 | Krishnaswamy et al. |
| 2007/0002833 A1 | 1/2007 | Bajic |
| 2007/0008884 A1 | 1/2007 | Tang |
| 2007/0010248 A1 | 1/2007 | Dravida et al. |
| 2007/0011318 A1 | 1/2007 | Roth |
| 2007/0021126 A1 | 1/2007 | Nanda et al. |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0032219 A1 | 2/2007 | Rudolf et al. |
| 2007/0054616 A1 | 3/2007 | Culbert |
| 2007/0058598 A1 | 3/2007 | Ling |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0081477 A1 | 4/2007 | Jakkahalli et al. |
| 2007/0082677 A1 | 4/2007 | Donald Hart et al. |
| 2007/0083924 A1 | 4/2007 | Lu |
| 2007/0086397 A1 | 4/2007 | Taylor |
| 2007/0091845 A1 | 4/2007 | Brideglall |
| 2007/0091889 A1 | 4/2007 | Xiao et al. |
| 2007/0098086 A1 | 5/2007 | Bhaskaran |
| 2007/0104197 A1 | 5/2007 | King |
| 2007/0106776 A1 | 5/2007 | Konno et al. |
| 2007/0109991 A1 | 5/2007 | Bennett |
| 2007/0110035 A1 | 5/2007 | Bennett |
| 2007/0115842 A1 | 5/2007 | Matsuda et al. |
| 2007/0121501 A1* | 5/2007 | Bryson ............... H04L 63/102 370/252 |
| 2007/0121618 A1 | 5/2007 | Hirano |
| 2007/0127423 A1 | 6/2007 | Ho |
| 2007/0133494 A1 | 6/2007 | Lai et al. |
| 2007/0135159 A1 | 6/2007 | Sinivaara |
| 2007/0135866 A1 | 6/2007 | Baker et al. |
| 2007/0136372 A1 | 6/2007 | Proctor et al. |
| 2007/0140163 A1 | 6/2007 | Meier et al. |
| 2007/0143851 A1 | 6/2007 | Nicodemus et al. |
| 2007/0147318 A1 | 6/2007 | Ross et al. |
| 2007/0150945 A1 | 6/2007 | Whitaker et al. |
| 2007/0171909 A1 | 7/2007 | Pignatelli |
| 2007/0183402 A1 | 8/2007 | Bennett |
| 2007/0189222 A1 | 8/2007 | Kolar et al. |
| 2007/0195793 A1 | 8/2007 | Grosser et al. |
| 2007/0206527 A1 | 9/2007 | Lo et al. |
| 2007/0230457 A1 | 10/2007 | Kodera et al. |
| 2007/0237093 A1 | 10/2007 | Rajagopalan et al. |
| 2007/0248009 A1 | 10/2007 | Petersen |
| 2007/0253369 A1 | 11/2007 | Abhishek et al. |
| 2007/0253380 A1 | 11/2007 | Jollota et al. |
| 2007/0255116 A1 | 11/2007 | Mehta et al. |
| 2007/0260720 A1 | 11/2007 | Morain |

(56) References Cited

U.S. PATENT DOCUMENTS

| | | |
|---|---|---|
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1 | 12/2007 | Kanada et al. |
| 2007/0291689 A1 | 12/2007 | Kapur et al. |
| 2007/0294722 A1 | 12/2007 | Kang et al. |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0014916 A1 | 1/2008 | Chen |
| 2008/0031257 A1 | 2/2008 | He |
| 2008/0039114 A1 | 2/2008 | Phatak et al. |
| 2008/0049615 A1 | 2/2008 | Bugenhagen |
| 2008/0052393 A1 | 2/2008 | McNaughton et al. |
| 2008/0056200 A1 | 3/2008 | Johnson |
| 2008/0056211 A1 | 3/2008 | Kim et al. |
| 2008/0064356 A1 | 3/2008 | Khayrallah |
| 2008/0080441 A1 | 4/2008 | Park et al. |
| 2008/0102815 A1 | 5/2008 | Sengupta et al. |
| 2008/0107077 A1 | 5/2008 | Murphy |
| 2008/0114784 A1 | 5/2008 | Murphy |
| 2008/0130523 A1 | 6/2008 | Fridman et al. |
| 2008/0151844 A1 | 6/2008 | Tiwari |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1 | 10/2008 | Namihira |
| 2008/0261615 A1 | 10/2008 | Kalhan |
| 2008/0276303 A1 | 11/2008 | Gast |
| 2009/0010206 A1 | 1/2009 | Giaretta et al. |
| 2009/0028118 A1 | 1/2009 | Gray et al. |
| 2009/0031044 A1 | 1/2009 | Barrack et al. |
| 2009/0046688 A1 | 2/2009 | Volpi et al. |
| 2009/0059930 A1 | 3/2009 | Ryan et al. |
| 2009/0129386 A1 | 5/2009 | Rune |
| 2009/0198999 A1 | 8/2009 | Harkins |
| 2009/0247103 A1 | 10/2009 | Aragon |
| 2009/0252120 A1 | 10/2009 | Delves |
| 2009/0257437 A1 | 10/2009 | Tiwari |
| 2009/0260083 A1 | 10/2009 | Szeto et al. |
| 2009/0274060 A1 | 11/2009 | Taylor |
| 2009/0287816 A1 | 11/2009 | Matta et al. |
| 2009/0293106 A1 | 11/2009 | Gray et al. |
| 2010/0002610 A1 | 1/2010 | Bowser et al. |
| 2010/0024007 A1 | 1/2010 | Gast |
| 2010/0040059 A1 | 2/2010 | Hu |
| 2010/0067379 A1 | 3/2010 | Zhao et al. |
| 2010/0113098 A1 | 5/2010 | Riley |
| 2010/0130212 A1 | 5/2010 | So et al. |
| 2010/0142478 A1 | 6/2010 | Forssell et al. |
| 2010/0159827 A1 | 6/2010 | Rhodes et al. |
| 2010/0172276 A1 | 7/2010 | Aragon |
| 2010/0180016 A1 | 7/2010 | Bugwadia et al. |
| 2010/0195549 A1 | 8/2010 | Aragon et al. |
| 2010/0252120 A1 | 10/2010 | Delves |
| 2010/0261475 A1 | 10/2010 | Kim et al. |
| 2010/0271188 A1 | 10/2010 | Nysen |
| 2011/0013588 A1 | 1/2011 | Jeon et al. |
| 2011/0047474 A1 | 2/2011 | Sung et al. |
| 2011/0128858 A1 | 6/2011 | Matta et al. |
| 2011/0158122 A1 | 6/2011 | Murphy et al. |
| 2011/0255466 A1 | 10/2011 | Gast et al. |
| 2012/0140705 A1 | 6/2012 | Matta et al. |
| 2012/0144462 A1 | 6/2012 | Pochop |
| 2012/0190320 A1 | 7/2012 | Aragon |
| 2012/0190323 A1 | 7/2012 | Aragon |
| 2012/0204031 A1 | 8/2012 | Harkins |
| 2015/0257152 A1 | 9/2015 | Hasegawa et al. |
| 2018/0063673 A1 | 3/2018 | Jang et al. |
| 2020/0404498 A1 | 12/2020 | Murphy et al. |
| 2023/0007477 A1 | 1/2023 | Murphy et al. |

FOREIGN PATENT DOCUMENTS

| | | |
|---|---|---|
| GB | 2329801 A | 3/1999 |
| GB | 2429080 A | 2/2007 |
| JP | 2000215169 A1 | 8/2000 |
| JP | 2003234751 A1 | 8/2003 |
| JP | 2003274454 A | 9/2003 |
| JP | 2004032525 A1 | 1/2004 |
| WO | 1994003986 A1 | 2/1994 |
| WO | 1999011003 A1 | 3/1999 |
| WO | 2000006271 A1 | 2/2000 |
| WO | 2000018148 | 3/2000 |
| WO | 2002089442 A1 | 11/2002 |
| WO | 2003085544 A1 | 10/2003 |
| WO | 2004013986 A1 | 2/2004 |
| WO | 2004095192 A2 | 11/2004 |
| WO | 2004095800 A1 | 11/2004 |
| WO | 2006014512 A2 | 2/2006 |
| WO | 2010130133 A1 | 11/2010 |

OTHER PUBLICATIONS

3COM, Wireless LAN Mobility System; Wireless LAN Switch and Controller Installation and Basic Configuration Guide, Revision B, Apr. 2005, 496 pages.

3COM, Wireless LAN Switch and Controller; Quick Start Guide, 3COM, Revision B, Nov. 2004, 10 pages.

3COM, Wireless LAN Switch Manager (3WXM), 3COM, Revision C, Oct. 2004, 8 pages.

Acampora and Winters IEEE Communications Magazine 25(8):11•20 (1987).

Acampora and Winters, IEEE Journal on selected Areas in Commmunications. SAC-5:796-804 (1987).

Akin, D., Aerohive Blog, Cooperative Control: Part 3, [Online] Retrieved from the Internet: <URL: http://blog.aerohive.com/blog/?p=71> Mar. 1, 2010, 3 pages.

Bahl P. et al. "User Location and Tracking in an In-Building Radio Network," Microsoft Research, Feb. 1999, 13 pages.

Bahl, P. et al., "A Software System for Locating Mobile Users: Design, Evaluation, and Lessons," Microsoft Research, Feb. 1999, 13 pages.

Bahl, P. et al., "RADAR: An In-Building RF-based User Location and Tracking System," Microsoft Research, Mar. 2000, 1 0 pages.

Barber, S., Monitoring 802.1 Networks, IEEE 802.11, Sydney, NSW, May 13-17, 2002.

Bing and Subramanian, IEEE 1318-1322 (1997).

Chen, Y-C et al., "Enabling Location-Based Services on Wireless LANs," Networks, 2003. ICON2003. The 11th IEEE International Conference, Sep. 28-Oct. 1, 2003, pp. 567-572.

Corrected Notice of Allowance from U.S. Appl. No. 17/815,039 dated Mar. 7, 2023, 11 pp.

Di Sorte, D., et al., "On the Performance of Service Publishing in IEEE 802.11 Multi-Access Environment," IEEE Communications Letters, vol. 11, No. 4, Apr. 2007, 3 pages.

Durgin, et al., "Measurements and Models for Radio Path Loss and Penetration Loss in and Around Homes and Trees at 5.85 GHz", IEEE Transactions on Communications, vol. 46, No. Nov. 11, 1998.

Erten, Y., "A Layered Security Architecture for Corporate 802.11 Wireless Networks," Wireless Telecommunications Symposium, May 14-15, 2004, pp. 123-128.

European Examination Report for Application No. 07796005.2, mailed Sep. 4, 2012.

Examination Report for European Application No. 02770460, Mar. 18, 2005.

Examination Report for European Application No. 06006504, mailed Oct. 10, 2006.

Extended Search Report for European Application No. 11188566.1, mailed Jan. 30, 2012.

Extended Search Report from counterpart European Application No. 07796005.2 dated Feb. 14, 2012, 10 pp.

Fifth Chinese Office Action for Chinese Application No. 200780029623.X, dated Sep. 3, 2013.

(56) References Cited

OTHER PUBLICATIONS

Final Office Action for U.S. Appl. No. 09/866,474, mailed Jun. 10, 2005.
Final Office Action for U.S. Appl. No. 10/667,027, mailed Feb. 26, 2007.
Final Office Action for U.S. Appl. No. 10/667,027, mailed Mar. 10, 2006.
Final Office Action for U.S. Appl. No. 10/667,136, mailed Mar. 9, 2007.
Final Office Action for U.S. Appl. No. 11/437,537, mailed Jul. 16, 2009.
Final Office Action for U.S. Appl. No. 11/845,029, mailed Dec. 9, 2010.
Final Office Action for U.S. Appl. No. 11/845,029, mailed Jan. 25, 2010.
Final Office Action for U.S. Appl. No. 12/077,051, mailed Oct. 25, 2011.
Final Office Action for U.S. Appl. No. 12/113,535, mailed Jan. 3, 2012.
Final Office Action for U.S. Appl. No. 12/474,020, mailed Oct. 4, 2010.
Final Office Action for U.S. Appl. No. 11/784,307, mailed Jun. 14, 2010.
Final Office Action for U.S. Appl. No. 11/330,877, mailed Apr. 22, 2010.
Final Office Action for U.S. Appl. No. 11/351,104, mailed Aug. 14, 2012.
Final Office Action for U.S. Appl. No. 12/370,562, mailed Jul. 26, 2012.
Final Office Action for U.S. Appl. No. 12/683,281, mailed Sep. 21, 2012.
Final Office Action for U.S. Appl. No. 11/094,987, mailed May 23, 2008.
Final Office Action for U.S. Appl. No. 11/330,877, mailed Mar. 13, 2009.
Final Office Action for U.S. Appl. No. 11/330,877, mailed May 27, 2011.
Final Office Action for U.S. Appl. No. 11/331,789, mailed Oct. 23, 2008.
Final Office Action for U.S. Appl. No. 11/351,104, mailed Jun. 10, 2009.
Final Office Action for U.S. Appl. No. 11/377,859, mailed Aug. 27, 2008.
Final Office Action for U.S. Appl. No. 11/417,830, mailed May 28, 2009.
Final Office Action for U.S. Appl. No. 11/437,387, mailed Jul. 15, 2009.
Final Office Action for U.S. Appl. No. 11/437,538, mailed Jun. 10, 2009.
Final Office Action for U.S. Appl. No. 11/437,582, mailed Jul. 22, 2009.
Final Office Action for U.S. Appl. No. 11/592,891, mailed Jul. 20, 2009.
Final Office Action for U.S. Appl. No. 11/595,119, mailed Aug. 2, 2011.
Final Office Action for U.S. Appl. No. 11/595,119, mailed Jan. 5, 2010.
Final Office Action for U.S. Appl. No. 11/852,234, mailed Jan. 20, 2012.
Final Office Action for U.S. Appl. No. 11/970,484, mailed Jul. 22, 2011.
Final Office Action for U.S. Appl. No. 12/210,917, mailed May 13, 2011.
Final Office Action for U.S. Appl. No. 12/336,492, mailed Jun. 15, 2012.
Final Office Action for U.S. Appl. No. 12/350,927, mailed Jan. 18, 2012.
Final Office Action for U.S. Appl. No. 12/401,073, mailed Apr. 1, 2011.
Final Office Action for U.S. Appl. No. 12/489,295, mailed Jan. 18, 2012.
First Office Action for Chinese Application No. 2007800229623.X, mailed Dec. 31, 2010.
Fortune et al., IEEE Computational Science and Engineering, Wise Design of Indoor Wireless Systems: Practical Computation and Optimization p. 58-68 (1995).
Fourth Office Action for Chinese Application No. 200780029623.X, dated Apr. 2, 2013.
Freret et al., "Applications of Spread-Spectrum Radio to Wireless Terminal Communications" Conf. Record Nat'l Telecom. Conf. Nov. 30-Dec. 4, 1980.
Geier, Jim, Wireless Lans Implementing Interoperable Networks, Chapter 3 (pp. 89-125) Chapter4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Persona Communications Systems", International Journal of—Wireless Information Networks, vol. 1, No. 1, 1994.
Information Sciences Institute, RFC-791—Internet Protocol, DARPA, Sep. 1981.
International Preliminary Examination Report for PCT/US02/28090, mailed Oct. 29, 2003.
International Search Report and Written Opinion for PCT/US04/30683, mailed Feb. 10, 2006.
International Search Report and Written Opinion for PCT/US04/30684, mailed Feb. 10, 2006.
International Search Report and Written Opinion for PCT/US04/30769, mailed Oct. 4, 2005.
International Search Report and Wiitten Opinion for PCT/US05/004702, mailed Aug. 10, 2006.
International Search Report and Written Opinion for PCT/US06/40498, mailed Dec. 28, 2007.
International Search Report and Written Opinion for PCT/US06/40499, mailed Dec. 13, 2007.
International Search Report and Written Opinion for PCT/US06/40500, mailed Aug. 17, 2007.
International Search Report and Written Opinion for PCT/US07/089134, mailed Apr. 10, 2008.
International Search Report and Written Opinion for PCT/US07/14847, mailed Apr. 1, 2008.
International Search Report and Written Opinion for PCT/US2006/009525, mailed Sep. 13, 2007.
International Search Report and Written Opinion for PCT/US2007/012194 dated Feb. 4, 2008.
International Search Report and Written Opinion for PCT/US2007/012195, mailed Mar. 19, 2008.
International Search Report and Written Opinion for PCT/US2007/12016, mailed Jan. 4, 2008.
International Search Report and Written Opinion for PCT/US2007/19696, mailed Feb. 29, 2008.
International Search Report and Written Opinion for PCT/US2008/010708, mailed May 18, 2009.
International Search Report for PCT/US02/28090, mailed Aug. 13, 2003.
International Search Report PCT/US07/013757 dated Jan. 22, 2008. pp. 5.
International Search Report PCT/US07/013758 dated Apr. 3, 2008, pp. 5.
Johnson et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarchpapers/dsr-chapterOO.pdf).
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleine-Ostmann, T. et al., "A Data Fusion Architecture for Enhanced Position Estimation in Wireless Networks," IEEE Communications Letters, vol. 5(8), Aug. 2001, p. 343-345.

(56) References Cited

OTHER PUBLICATIONS

Kleinrock and Scholl, Conference record 19771CC vol. 2 of 3, Jun. 12-15 Chicago Illinois "Packet Switching in radio Channels: New Conflict-Free Multiple Access Schemes for a Small Number of data Users", (1977).
LAN/MAN Standards Committee of the IEEE Computer Society, Part 11: Wireless LAN Medium Access Control (MAC) and Physical Layer (PHY) Specifications: Higher Speed Physical layer Extension in the 2.4 GHz Band, IEEE Std. 802.11b (1999).
Latvala J. et al., "Evaluation of RSSI-Based Human Tracking," Proceedings for the 2000 European Signal Processing Conference, Sep. 2000, 9 pages.
Latvala, J. et al. "Patient Tracking in a Hospital Environment Using Extended Kalman-filtering," Proceedings of the 1999 Middle East Conference on Networking, Nov. 1999, 5 pages.
Law, A., "New Service Discovery Protocol," Internet Citation [Online] XP002292473 Retrieved from the Internet: <URL: http://sem.uccalgary.ca-lawa/SENG60921/arch/SDP.htm> [retrieved Aug. 12, 2004] (15 pages).
Martinez, P. et al., "Using the Script MIB for Policy-based Configuration Management," Technical University Braunschweig, Braunschweig, Germany, 2002.
McCann, S., et al., "Emergency Services for 802," IEEE 802.11-07/0505rl, Mar. 2007,27 pages.
Microsoft Computer Dictionary, Fifth Edition, Microsoft Corporation, 2002, 2 pages.
Myllymaki, P. et al., "A Probabilistic Approach to WLAN User Location Estimation," Third IEEE Workshop on Wireless Local Area Networks, Sep. 27-28, 2001, 12 pages.
Non-Final Office Action for U.S. Appl. No. 11/351,104, mailed Dec. 17, 2012.
Non-Final Office Action for U.S. Appl. No. 11/377,859, mailed Jan. 8, 2008.
Notice of Allowance from U.S. Appl. No. 17/815,039 dated Jan. 31, 2023, 13 pp.
Notice of Allowance from U.S. Appl. No. 17/815,039 dated May 1, 2023, 8 pp.
Office Action for Canadian Application No. 2,638,754, mailed Oct. 3, 2011.
Office Action for Japanese Application No. 2006-088348, mailed Jan. 4, 2011.
Office Action for U.S. Appl. No. 12/172,195, mailed Feb. 14, 2013.
Office Action for U.S. Appl. No. 09/866,474, mailed Nov. 30, 2004.
Office Action for U.S. Appl. No. 10/666,848, mailed Mar. 22, 2007.
Office Action for U.S. Appl. No. 10/667,027, mailed Jul. 29, 2005.
Office Action for U.S. Appl. No. 10/667,027, mailed May 5, 2006.
Office Action for U.S. Appl. No. 10/667,136, mailed Aug. 28, 2006.
Office Action for U.S. Appl. No. 10/667,136, mailed Jan. 25, 2006.
Office Action for U.S. Appl. No. 11/648,359, mailed Nov. 19, 2009.
Office Action for U.S. Appl. No. 11/845,029, mailed Jul. 9, 2009.
Office Action for U.S. Appl. No. 11/845,029, mailed May 14, 2010.
Office Action for U.S. Appl. No. 11/845,029, mailed Sep. 27, 2011.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 20, 2012.
Office Action for U.S. Appl. No. 12/113,535, mailed Apr. 21, 2011.
Office Action for U.S. Appl. No. 12/113,535, mailed Nov. 1, 2012.
Office Action for U.S. Appl. No. 12/474,020, mailed Jun. 3, 2010.
Office Action for U.S. Appl. No. 13/437,669, mailed May 30, 2012.
Office Action for U.S. Appl. No. 13/437,673, mailed May 30, 2012.
Office Action for U.S. Appl. No. 13/568,861, mailed Oct. 24, 2012.
Office Action for U.S. Appl. No. 11/784,307, mailed Sep. 22, 2009.
Office Action for U.S. Appl. No. 12/957,997, mailed Aug. 28, 2012.
Office Action for U.S. Appl. No. 10/235,338, mailed Jan. 8, 2003.
Office Action for U.S. Appl. No. 11/094,987, mailed Dec. 27, 2007.
Office Action for U.S. Appl. No. 11/094,987, mailed Oct. 21, 2008.
Office Action for U.S. Appl. No. 11/326,966, mailed Nov. 14, 2008.
Office Action for U.S. Appl. No. 11/330,877, mailed Aug. 6, 2009.
Office Action for U.S. Appl. No. 11/330,877, mailed Jan. 13, 2011.
Office Action for U.S. Appl. No. 11/330,877, mailed Sep. 11, 2008.
Office Action for U.S. Appl. No. 11/331,789, mailed Aug. 5, 2009.
Office Action for U.S. Appl. No. 11/331,789, mailed Jun. 13, 2008.
Office Action for U.S. Appl. No. 11/351,104, mailed Dec. 2, 2009.
Office Action for U.S. Appl. No. 11/351,104, mailed Feb. 15, 2012.
Office Action for U.S. Appl. No. 11/351,104, mailed Jul. 26, 2011.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Oct. 28, 2008.
Office Action for U.S. Appl. No. 11/400,165, mailed Aug. 19, 2008.
Office Action for U.S. Appl. No. 11/417,830, mailed Nov. 14, 2008.
Office Action for U.S. Appl. No. 11/417,993, mailed Oct. 29, 2008.
Office Action for U.S. Appl. No. 11/437,387, mailed Dec. 23, 2008.
Office Action for U.S. Appl. No. 11/437,537, mailed Dec. 23, 2008.
Office Action for U.S. Appl. No. 11/437,538, mailed Dec. 22, 2008.
Office Action for U.S. Appl. No. 11/437,582, mailed Jan. 8, 2009.
Office Action for U.S. Appl. No. 11/487,722, mailed Aug. 7, 2009
Office Action for U.S. Appl. No. 11/592,891, mailed Jan. 15, 2009.
Office Action for U.S. Appl. No. 11/595,119, mailed Aug. 19, 2010.
Office Action for U.S. Appl. No. 11/595,119, mailed Jul. 21, 2009.
Office Action for U.S. Appl. No. 11/604,075, mailed May 3, 2010.
Office Action for U.S. Appl. No. 11/643,329, mailed Jul. 9, 2010.
Office Action for U.S. Appl. No. 11/852,234, mailed Apr. 27, 2011.
Office Action for U.S. Appl. No. 11/852,234, mailed Aug. 9, 2010.
Office Action for U.S. Appl. No. 11/852,234, mailed Jan. 21, 2010.
Office Action for U.S. Appl. No. 11/852,234, mailed Jun. 29, 2009.
Office Action for U.S. Appl. No. 11/970,484, mailed Jun. 20, 2012.
Office Action for U.S. Appl. No. 11/970,484, mailed Nov. 24, 2010.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/210,917, mailed Dec. 5, 2011.
Office Action for U.S. Appl. No. 12/210,917, mailed Nov. 15, 2010.
Office Action for U.S. Appl. No. 12/336,492, mailed Sep. 15, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 12/370,562, mailed Apr. 6, 2011.
Office Action for U.S. Appl. No. 12/370,562, mailed Jan. 17, 2012.
Office Action for U.S. Appl. No. 12/370,562, mailed Sep. 30, 2010.
Office Action for U.S. Appl. No. 12/401,073, mailed Aug. 23, 2010.
Office Action for U.S. Appl. No. 12/401,073, mailed Sep. 20, 2011.
Office Action for U.S. Appl. No. 12/489,295, mailed Apr. 27, 2011.
Office Action for U.S. Appl. No. 12/500,392, mailed Jun. 20, 2011.
Office Action for U.S. Appl. No. 12/683,281, mailed Jan. 20, 2012.
Office Action for U.S. Appl. No. 12/785,362, mailed Apr. 22, 2011.
Office Action for U.S. Appl. No. 13/396,124, mailed May 7, 2012.
Okamoto and Xu, IEEE, Proceeding so of the 13 Annual Hawaii International Conference on System Sciences. pp. 54-63 (1997).
Pack, S. et al., "Fast-Handoff Support in IEEE 802.11 Wireless Networks," IEEE Communications Surveys, IEEE, NY, NY, vol. 9, No. 1, First Quarter 2007 (pp. 2-12) ISSN: 1553-877X.
Panjwani et al., Interactive Computation of Coverage Regions for Wireless Communication in Multifloored Indoor Environments, IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, April 6-8, pp. 45-50 (1977).
Piazzi et al., "Achievable Accuracy of Site-Specific Path-Loss Predictions in Residential Environments" IEEE Transactions on Vehicular Technology, vol. 48, No. 3, May 1999.
Potter, B et al., 802.11 Security, O'Reilly Media Inc., Dec. 2002, 14 pages.
Prosecution History from U.S. Appl. No. 11/801,964, dated Aug. 8, 2007 through Aug. 2, 2014, 73 pp.
Prosecution History from U.S. Appl. No. 12/304,100, now issued U.S. Pat. No. 9,258,702, dated Jun. 17, 2011 through Dec. 14, 2015, 312 pp.
Prosecution History from U.S. Appl. No. 14/468,079, dated Feb. 11, 2015 through Sep. 2, 2015, 29 pp.
Prosecution History from U.S. Appl. No. 14/951,766, dated Jul. 12, 2017 through Jul. 13, 2020, 252 pp.
Prosecution History from U.S. Appl. No. 14/996,088, now issued U.S. Pat. No. 9,838,942, dated Jul. 26, 2016 through Aug. 10, 2017, 81 pp.

(56) References Cited

OTHER PUBLICATIONS

Prosecution History from U.S. Appl. No. 15/803,208, now issued U.S. Pat. No. 10,327,202, dated Jul. 27, 2018 through Feb. 7, 2019, 73 pp.
Prosecution History from U.S. Appl. No. 16/401,904, dated Feb. 6, 2020 through Jun. 4, 2020, 35 pp.
Prosecution History from U.S. Appl. No. 17/012,990, dated Dec. 3, 2021 through Mar. 8, 2023, 114 pp.
Prosecution History from U.S. Appl. No. 17/069,353, dated Nov. 3, 2021 through Apr. 27, 2022, 23 pp.
Pulson, Time Domain Corporation, Ultra wideband (UWB) Radios for Precision Location, Third IEEE Workshop on Wireless Local Area Networks, Sep. 27-28, 2001, 8 pages.
Puttini, R., Percher, J., Me, L., and De Sousa, R. 2004. A fully distributed IDS for MANET. In Proceedings of the Ninth international Symposium on Computers and Communications 2004 Volume 2 (lscc"04)—vol. 02 (Jun. 28-Jul. 1, 2004), ISCC, IEEE Computer Society, Washington, DC 331-338.
Response to Communication pursuant to Article 94(3) EPC dated Sep. 4, 2012, from counterpart European Application No. 07796005.2 filed Jan. 3, 2013, 7 pp.
Response to Extended Search Report dated Feb. 14, 2012, from counterpart European Application No. 07796005.2 filed Aug. 9, 2012, 15 pp.
Second Office Action for Chinese Application No. 200780029623. X, mailed Mar. 7, 2012.
Seidel et al., "Site-Specific Propagation Prediction for Wireless In-Building Personal Communications System Design", IEEE Transactions on Vehicular Technology, vol. 43, No. 4, Nov. 1994.
Skidmore et al., Interactive Coverage Region and System Design Simulation for Wireless Communication Systems in Multi-floored Indoor Environments, SMT Plus IEEE ICUPC '96 Proceedings (1996).
Summons for Oral Hearing Proceedings for European Application No. 02770460, filed Jan. 31, 2006.
Supplementary Partial European Search Report for European Application No. 02770460, mailed Aug. 20, 2004.
Supplementary Partial European Search Report for European Application No. 02770460, mailed Dec. 15, 2004.
Third Office Action for Chinese Application No. 200780029623.X, mailed Sep. 29, 2012—translation Yes.
Thomson, A., Cisco Systems, AP Power Down Notification, Power Point slide show; IEEE standards committee meeting Jul. 15, 2008; doc.: IEEE 802.11-08/0759r0, 14 pages.
U.S. Appl. No. 18/297,334, filed Apr. 7, 2023, naming inventors Murphy et al.
U.S. Appl. No. 09/866,474, filed May 29, 2001.
U.S. Appl. No. 12/603,391, filed Oct. 21, 2009.
U.S. Appl. No. 12/763,057, filed Apr. 19, 2010.
U.S. Appl. No. 13/006,950, filed Jan. 14, 2011.
Ullmo et al., Wireless Propagation in Buildings: A Statistic Scattering Approach, IEEE Transactions on Vehicular Technology, vol. 48 No. 3, May 1999.
Wikipedia, Wireless LAN, 2 definitions for wireless LAN roaming, [Online] [retrieved Oct. 4, 2010] Retrieved from the Internet: <URL: http://en.wikipedia.org/wiki/Wireless LAN> (1 page).

\* cited by examiner

AP-LOCAL DYNAMIC SWITCHING

CROSS-REFERENCE TO RELATED PATENT APPLICATIONS

This application is a continuation of U.S. patent application Ser. No. 17/012,990, filed 4 Sep. 2020, which is a continuation of U.S. patent application Ser. No. 16/401,904, filed 2 May 2019, now U.S. Pat. No. 10,798,650, which is a continuation of U.S. patent application Ser. No. 15/803,208, filed 3 Nov. 2017, now U.S. Pat. No. 10,327,202, which is a continuation of U.S. patent application Ser. No. 14/996,088, filed 14 Jan. 2016, now U.S. Pat. No. 9,838,942, which is a continuation of U.S. patent application Ser. No. 12/304,100, filed 11 Jun. 2007, now U.S. Pat. No. 9,258,702, which is a national stage of International Patent Application No. PCT/US2007/013757, filed 11 Jun. 2007, which claims the benefit of U.S. Provisional Patent Application No. 60/812,403, filed 9 Jun. 2006, and which is a Continuation-in-Part of U.S. patent application Ser. No. 11/801,964, filed 11 May 2007, now U.S. Pat. No. 8,818,322, the entire content of each application is incorporated herein by reference.

BACKGROUND

An access point (AP) is a device used by wireless clients to connect to a network. An AP functions as a standalone entity in some implementations and functions in cooperation with distribution hardware in other implementations. Distribution hardware may include a wireless switch used to manage APs and provide network-connectivity to wireless clients. A wireless domain may refer to a group of wireless switches that are configured to exchange relevant information, and using this information make informed decisions. A known device is a station (e.g., a wireless AP or client device) that is part of a network wireless installation.

Trapeze Networks, Inc. (Trapeze), uses a MOBILITY POINT® (MP®) APs in a MOBILITY DOMAIN™ wireless domain. An MP® AP is coupled to a MOBILITY EXCHANGE® (MX®) wireless switch. Trapeze uses MOBILITY DOMAIN™ to refer to a collection of MX® switches. This collection of MX® switches shares RF environment and station association information. This information is used by the MX® switches to support features including by way of example but not limitation roaming, auto channel selection, rogue AP detection, intrusion detection and/or the launching of countermeasures. Some additional details regarding the Trapeze-specific implementation is provided by way of example but not limitation, including novel features that are discussed later in this application, in the provisional application to which this application claims priority.

In a typical implementation, switching is performed, as may be expected, by the switch. However, it is also possible to perform native switching at an AP. It is a non-trivial problem to coordinate AP-local switching with centralized control. It is also a non-trivial problem to provide hybrid switching, that is, AP-local switching combined with switching at the switch.

These are but a subset of the problems and issues associated with wireless access point authentication, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A technique for implementing AP-local dynamic switching involves Layer 2 switching. This may be accomplished by providing data associated with wireless stations to an AP sufficient to enable the AP to determine whether traffic from a particular wireless station should be locally switched. Alternatively, the wireless station may be able to determine whether to locally switch traffic based upon the traffic itself. For example, it may be desirable to AP-locally switch voice traffic to avoid latency, which is particularly detrimental to voice transmissions such as voice-overIP. Traffic that is not to be switched locally is Layer 2 tunneled upstream.

The proposed system can offer, among other advantages, efficient utilization of bandwidth, reduced latency, network efficiency, reliability. This and other advantages of the techniques described herein will become apparent to those skilled in the art upon a reading of the following descriptions and a study of the several figures of the drawings.

BRIEF DESCRIPTION OF THE DRAWINGS

Embodiments of the claimed subject matter are illustrated in the figures. However, the embodiments and figures are illustrative rather than limiting; they provide examples of the claimed subject matter.

DETAILED DESCRIPTION

In the following description, several specific details are presented to provide a thorough understanding of embodiments of the claimed subject matter. One skilled in the relevant art will recognize, however, that the claimed subject matter can be practiced without one or more of the specific details, or in combination with other components, etc. In other instances, well-known implementations or operations are not shown or described in detail to avoid obscuring aspects of various embodiments, of the claimed subject matter.

Figure 1:
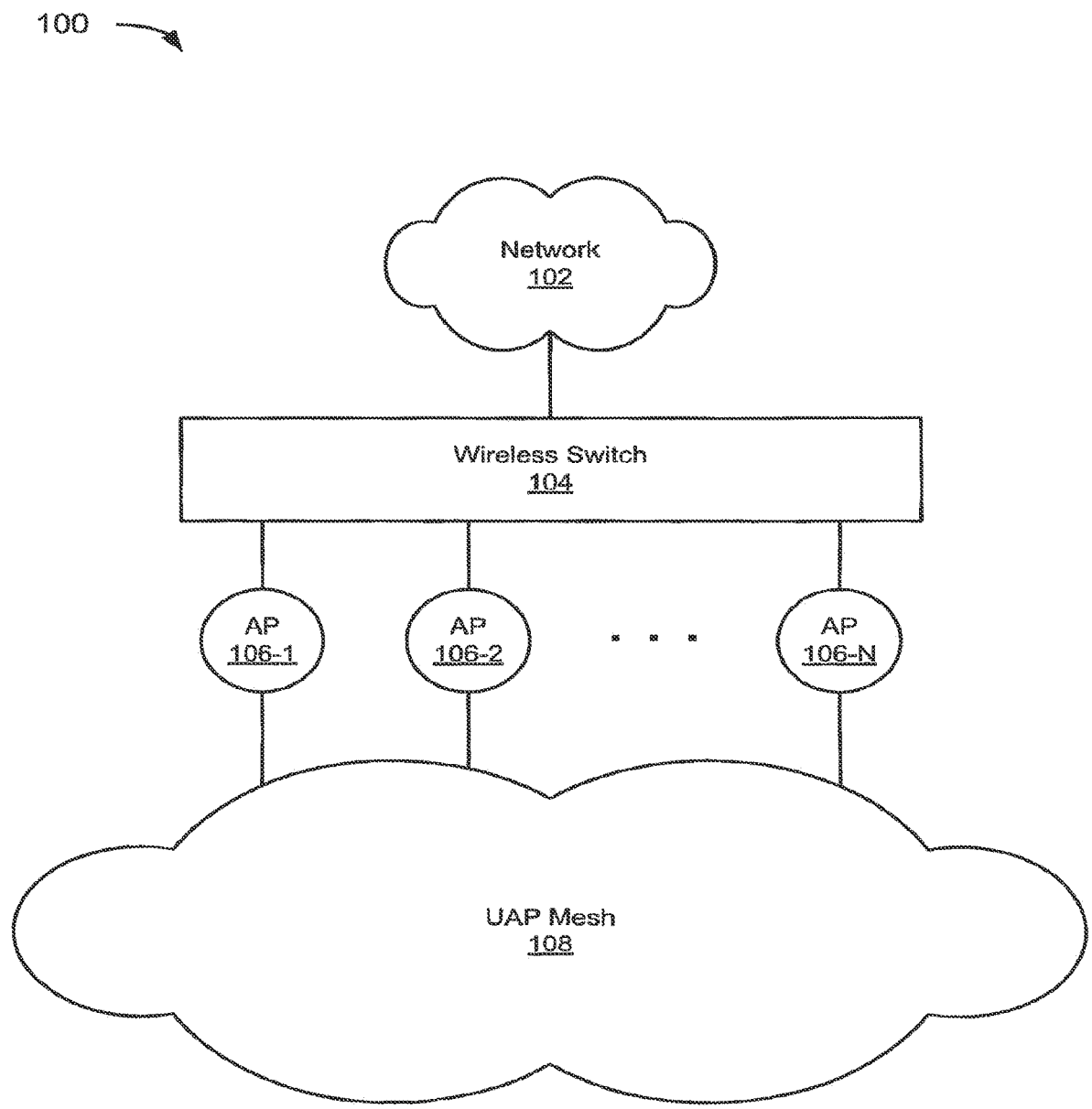
FIG. 1 depicts an example of a system including an untethered access point (UAP) mesh.

FIG. 1 depicts an example of a system 100 including an untethered access point (UAP) mesh. In the example of FIG. 1, the system 100 includes a network 102, a wireless switch 104, one or more APs 106-1 to 106-N (referred to collectively as APs 106), and a UAP mesh 108. It should be noted that while an overlay switching model is in some ways replaced by the techniques described herein, it may be desirable to prevent the implementation of local switching from removing any functionality of the overlay model.

An overlay switch model includes APs that tunnel to an upstream switch (e.g., an MX®), allowing the switch to perform complex policy and forwarding decisions locally. Centralizing switching to an upstream switch has allowed AP switching code to remain relatively simple (supporting the Thin-AP model). The AP at least knows it is on a subnet from which the upstream switch is reachable. The advantages of the overlay model include keeping the AP code and configuration simple; allowing a wireless network to be deployed over an arbitrary access network connecting the AP to the upstream switch (since client traffic is tunneled, it does not see the access network, so stations on the AP can be on completely different LANs than those available to the AP); and switches can form tunnels between themselves and send client traffic in those tunnels to further extend the choice of VLANs any given client on any AP may join. However, the overlay network suffers from the following: all traffic must pass through the upstream switch, which might be very far from the AP; complications involving MTU and other middle box issues when tunneling traffic; and not taking advantage of the distributed forwarding computational power available at the APs (in general, designs that push forwarding issues to the edge scale better).

The network 102 may include an Internet protocol (IP) network. In an embodiment, the network 102 is a wired backbone to which the wireless switch 104 is coupled. However, the network 102 may alternatively represent the network, or any other network, to which a backbone network is coupled or which acts as an alternative to a backbone network. Thus, the network 102 could include, for example, the Internet.

The wireless switch 104 is typically wire connected to the APs 106. Thus, the "wireless" switch could be thought of, depending upon the implementation, as a switch for wireless traffic to and/or from a wired network. The wireless switch 104 is not necessarily wirelessly connected to anything. Each of the APs 106 could be wire coupled to respective switches such that each switch is wire coupled to only a single AP. So, although the one or more APs 106 is depicted as a plurality in the example of FIG. 1, it should be understood that the number of APs per switch is implementation- and/or embodiment-specific. An AP and the wireless switch 104 could be combined into a single device. However, in this description, the functionality of an AP is differentiated from the functionality of a switch by acting as if the APs and the wireless switches are distinct devices.

The wireless switch 104 may or may not have all of the tools to manage wireless stations and the UAP mesh locally. For example, there may be additional management (e.g., AAA servers) further upstream from the wireless switch 104. Since it is not critical where these services take place beyond the wireless switch 104, for illustrative simplicity, it is assumed that the wireless switch 104 handles all of these functions, either locally or by utilizing upstream components. For this reasons, the figures (other than FIG. 1) do not depict components further upstream from the wireless switch 104.

Wireless data may include, by way of example but not limitation, station association data and RF environment data. The station and RF data is used by the wireless switches 104 to support features including, by way of example but not limitation, roaming, auto channel selection, rogue AP detection, intrusion detection and the launching of countermeasures. The wireless switch 104 may share wireless data with other wireless switches (not shown).

The wireless switch 104 controls the APs 106 (and the APs in the UAP mesh 108). In an embodiment, the APs 106 include radio transmitters and receivers (e.g., transceivers) that are used to provide wireless network connectivity for users and station access to the functions of the wireless switch 104. Within an IEEE 802.11 context, a station is any IEEE 802.11 entity or the equivalent in other related standards, and it may be roaming or stationary. It should be noted that this definition may include APs.

In the example of FIG. 1, each of the APs 106 anchors at least a portion of the UAP mesh 108 to the wired network. The APs 106 may be treated as border devices between the wireless switch 104 (or other upstream components of the system 100) and the UAP mesh 108. This enables more efficient use of wireless resources because proxy address resolution protocol (proxy ARP) may be used to enable the APs 106 to answer ARP requests on behalf of a remote device (e.g., a UAP for which an AP serves as an anchor to the wireless switch 104).

In a non-limiting 802.11 implementation, each of the APs 106 supports switching packets from a radio interface to a wired interface as a standard 802.3 frame. The AP switching path may or may not support 802.1q tagged packets and may or may not support MAC or user-based ACLs. (Port, VLAN, or VPORT based ACLs may or may not be required.) It may be desirable for an AP to support local switching and overlay simultaneously. However, even if it does, it is not a requirement that packets should be switched locally and in overlay mode simultaneously. For example, a given VLAN on an AP may be switched either locally or in overlay mode.

In the example of FIG. 1, the UAP mesh 108 is intended to depict a plurality of potentially discrete APs that do not have a wired connection to the wireless switch 104 or to the APs 106. That is why the APs in the wireless mesh are referred to as "untethered." Any station in the UAP mesh 108, whether a UAP or some other wireless station, is anchored to the wireless switch 104 by the AP 106 and zero or more UAPs that make up a chain of nodes from the station to the AP 106. An AP that is closer to the wireless switch 104 'in the chain may be referred to as anchoring downstream stations. For any given station, the path from the station to the wireless switch 104 may be referred to as a spanning tree because the UAP mesh 108 should not allow loops for traffic passing between a station and the wireless switch 104.

When a UAP in the UAP mesh 108 is brought online, it will attempt to reach the wireless switch 104 through a path that is optimal. (Note: Although an optimal path is desired, it may or may not be accomplished in practice, depending upon the implemented algorithm and/or environmental factors). There are multiple metrics for measuring the distance of a UAP from one of the APs 106. For example, the metric may be time. That is, the amount of time it takes for a packet to travel between the UAP and the AP anchoring the UAP. Although such a metric may work fine, it will typically vary depending upon environmental factors, such as traffic congestion or degraded received signal strength. For simplicity, the metric used herein is the number of hops between the UAP and the anchoring AP (AAP), with the understanding that this is but one of many potential metrics. Thus, if a UAP is one hop away from the AAP, the UAP may be referred to as a one-hop UAP. In general, a UAP may be referred to as an N-hop UAP where the UAP is N hops from the AAP.

Advantageously, UAPs of the UAP mesh 108 may include an AP-local switching engine embodied in a computer-readable medium. An AP-local switching engine may make use of a station switching record (SSR) to determine how to switch a given message unit (e.g., a packet, frame, datagram, etc.). This enables at least some traffic to be efficiently switched within the UAP mesh 108. Moreover, advantageously, some traffic may be tunneled back to a switch, while other traffic is locally switched. Which traffic is tunneled back, and which traffic is locally switched, is an implementation-specific decision that becomes available by using the teachings described herein.

The SSR may include any information available at an upstream switch. In a non-limiting embodiment, the data available to the switch following station association and authentication includes station MAC, VLAN number, VLAN name, a local switch flag, a tagging flag, radio port, radio tag (used to map the radio port to the VLAN), ACLs (e.g., ingress and egress ACLs to be mapped to the station MAC), and/or a proxy-ARP flag. (Note: the proxy-ARP might only be honored if local switching is enabled.) In an illustrative embodiment that enables local switching for a particular VLAN (other examples are described later with reference to FIGS. 3A to 3D), the local switch flag is set to TRUE if local switching is enabled for the AP and the AP is connected to the VLAN specified by VLAN name. The tagging flag is set to TRUE if the station's VLAN is reachable through a 0.1 q tag. When this flag is TRUE, the VLAN-number may be taken as the 0.1 q tag value. With this information, the AP can create a VLAN and add the specified radio ports and wired ports to the VLAN with the specified tag values. The AP then sends the packet of learning from its network port to potentially update any intermediate switches.

It will be appreciated in light of the description provided herein that although aspects of the claimed subject matter are described relative to IEEE 802.11 standards, and that certain embodiments have particular features that are implemented within the 802.11 context, the claimed subject matter itself is not limited to 802.11 networks and may generally be applied to any applicable wireless network; and to the extent that future technological enhancements might obscure the distinctions between wireless switches, APs, and/or stations, the claimed subject matter is understood to include components providing the features of such switches, APs, and stations independently of how they are packaged, combined, or labeled.

In an illustrative embodiment, the UAP mesh 108 is created from a spanning tree. Each station in the UAP mesh 108 attempts to reach the wireless switch 104 along an optimal path. Assuming the optimal path is measured in the number of hops to the wire, if a first station's traffic passes through a UAP and along a path from there to the wire, a second station's traffic that passes through the UAP will take the same path from there to the wire. Since aU stations take the optimal path, the stations may be represented as edge nodes of a tree where the AP at the wire is the root node. Thus, the AP mesh acts as a spanning tree for each station. It may be noted that the spanning tree is greedy at each node, which naturally results in an efficient (perhaps even optimized) tree flow.

Reducing the amount of data that passes through a wireless node, such as a UAP, to a wired switch is advantageous at least in part because wireless resources are relatively scarce. There is less need to conserve wired resources. However, conservation of wired resources is nevertheless of value in many cases. Accordingly, the teachings described herein with reference to an AP may be applicable to a wired AP, such as the APs 106 (FIG. 1) or to a wireless AP, such the UAPs of the UAP mesh 108 (FIG. 1). For this reason, in subsequent figures, an AP may refer to a wired or wireless AP, unless specifically identified as a UAP, which is wireless by definition (i.e., a UAP is an "untethered" AP).

Figure 2:
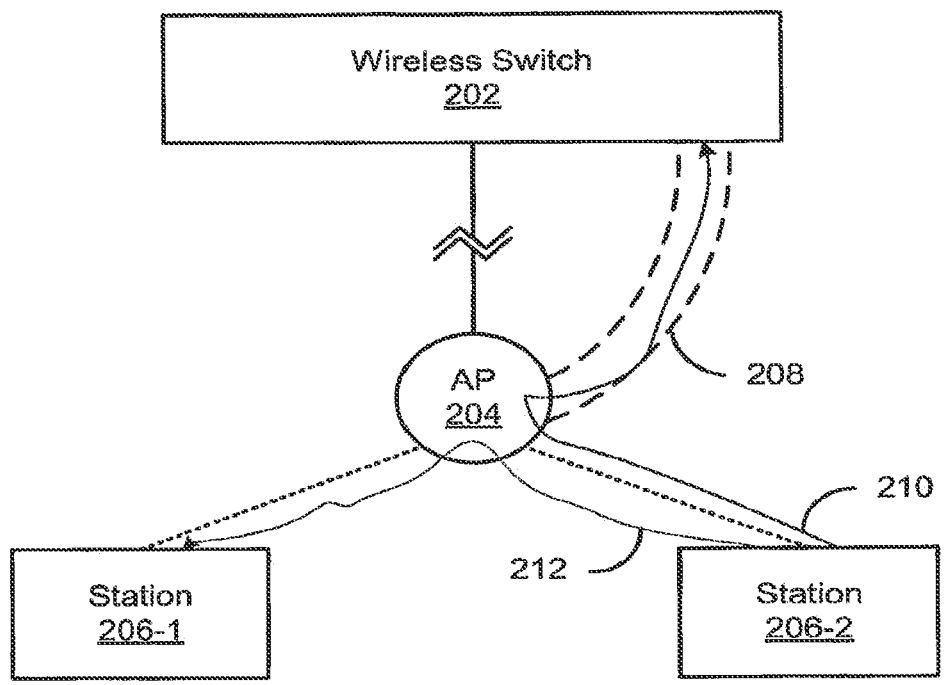
FIG. 2 depicts an example of a AP-local dynamic switching system.

FIG. 2 depicts an example of a AP-local dynamic switching system 200. The system 200 includes a wireless switch 202, an AP 204 coupled to the switch 202, and two stations 206-1 and 206-2 (referred to collectively as wireless stations 206) wirelessly coupled to the AP 204. In an illustrative embodiment, the switch 202 provides the AP 204 with data in the form of an SSR, which may include various data about the wireless stations 206 (or, more generally, about wireless stations coupled to the switch 202 through the AP 204). The SSR may be any data structure that includes data sufficient to facilitate native switching at the AP 204 or switching at the wireless switch 202. The AP 204 decides whether to natively switch using, by way of example but not limitation, SSID, the class of data associated with the message, a VLAN associated with the station sending the message, authentication data associated with the user of the station sending the message, or some other factor.

In an illustrative embodiment, the wireless switch 202 knows that the AP 204 is to perform local switching and to which VLANs (if applicable) the AP is connected. However, this is not an absolute requirement.

In an illustrative embodiment, the AP 204 is a layer 2 switch. In an illustrative embodiment, the AP 204 is coupled to the wireless switch 202 via a tunnel 208. Thus, a message can be tunneled to the wireless switch 202 for layer 2 switching at the wireless switch 202. It should be noted that it may be difficult to support multiple layer 3 protocols. So, by keeping the switching at layer 2, the system 200 need not have a specific layer 3 protocol (e.g., IP). Moreover, if you have a layer 3 backbone with policy in the routers, switching may defeat the policy. Advantageously, layer 2 switching at least reduces or eliminates these problems.

Since the AP 204 is a switching device, in an illustrative embodiment, the wireless switch 202 does not need to perform packet replication for multicast. Hence, a single multicast packet is transmitted from the wireless switch 202 to the AP 204 where it is replicated by the AP 204 as needed.

In the example of FIG. 2, the station 206-2 sends messages 210,212 to the AP 204. The AP 204 treats the messages differently according to data available to the AP 204. In the example of FIG. 2, the AP 204 sends the message 210 to the switch 202 via the tunnel 208. In the example of FIG. 2, the AP 204 performs AP-local switching on the message 212 and sends the message 212 to the station 206-1. It should be noted that the message 210 could be switched at the switch 202 and sent to the station 206-1. Some examples of the various factors that could be considered when the AP 204 determines whether to switch locally or at the switch 202 (e.g., by tunneling) are explored by way of example but not limitation in the FIGS. 3A to 30.

Figure 3A:
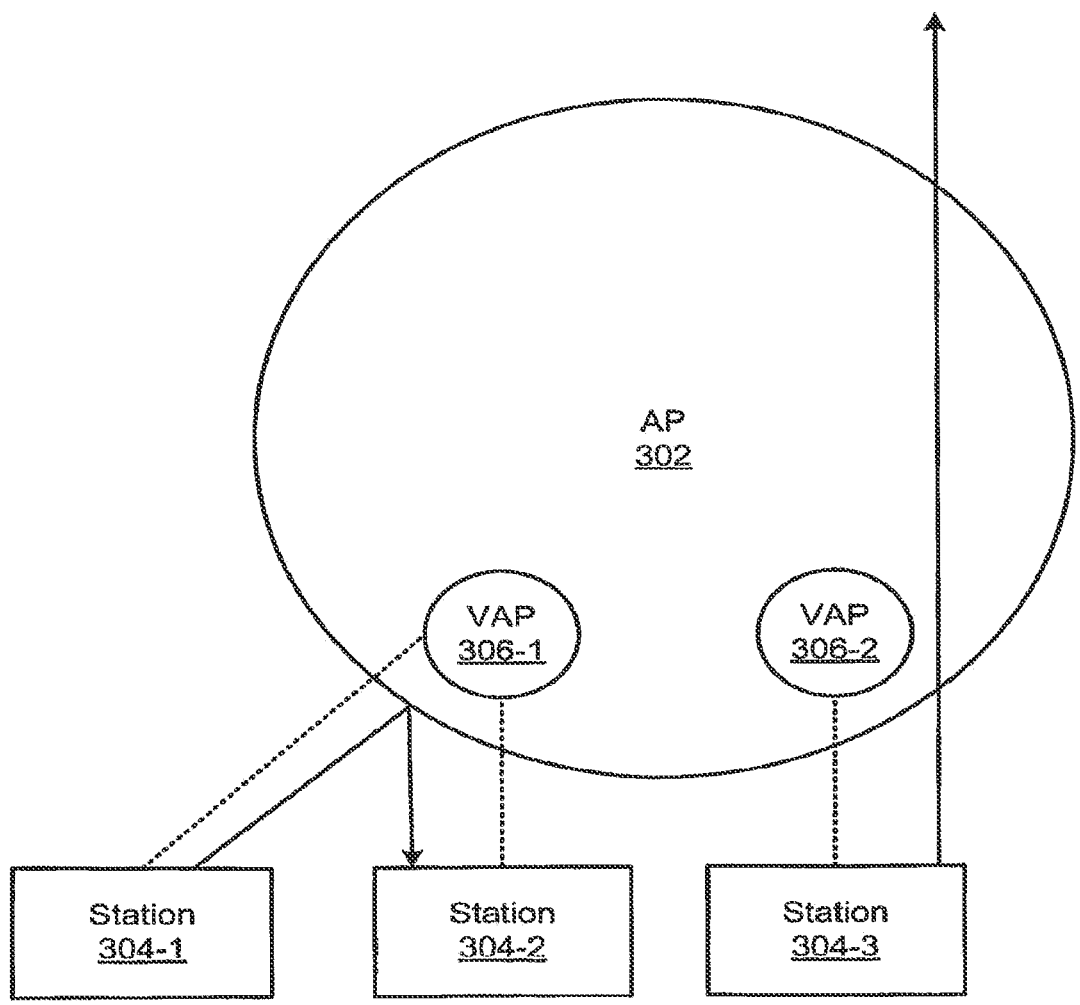
FIGS. 3A to 3D depict by way of example but not limitation various factors that could be considered when determining whether to switch locally at an AP or at a switch.

FIG. 3A depicts an example of a system 300A performing AP-local dynamic switching per SSID. The system 300A includes an AP 302 and stations 304-1 to 304-3 (referred to collectively as the stations 304). For illustrative purposes only, the AP 302 includes two virtual APs (VAPs) 306-1 and 306-2 (referred to collectively as VAPs 306). As one of skill in the relevant arts would know, an AP can broadcast or otherwise handle multiple SSIDs. If the AP broadcasts or otherwise handles more than one SSID, the AP may be logically treated as multiple APs; each of the logical APs, associated with respective SSIDs may be referred to as a VAP. In the example of FIG. 3A, the AP 302 switches traffic through VAP 306-1 locally, if possible, and passes traffic through VAP 306-2 upstream for upstream switching. It may be noted that in a non-limiting embodiment, the AP 302 may perform AP-local dynamic switching per SSID, even if the AP 302 handles a single SSID; the determination is still dynamic even if only one outcome is possible.

Figure 3B:
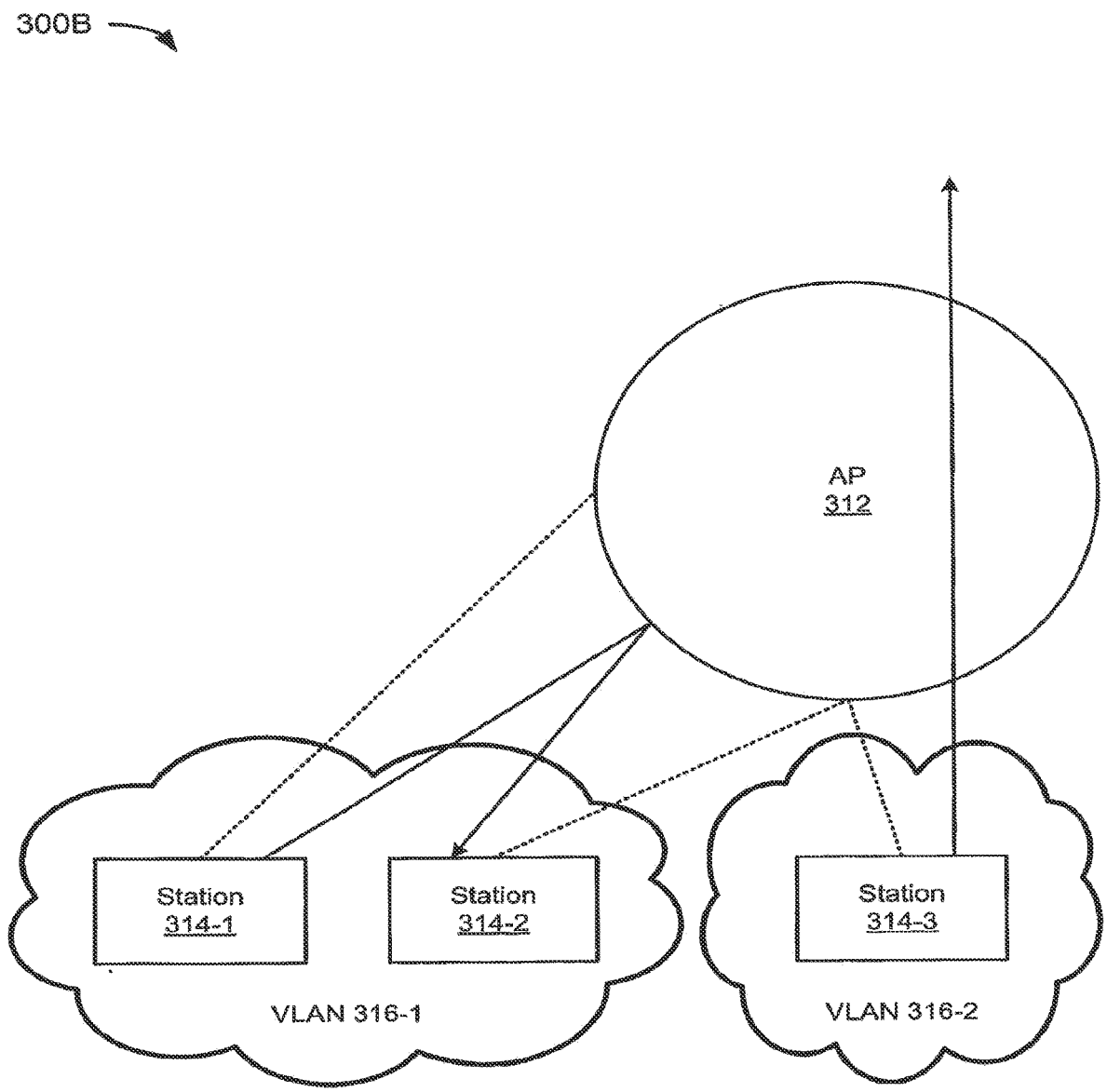

FIG. 3B depicts an example of a system 300B performing AP-local dynamic switching per VLAN. The system 300B includes an AP 312 and stations 314-1 to 314-3 (referred to collectively as the stations 314). The stations are divided into VLANs 316-1 and 316-2 (referred to collectively as the VLANs 316). For illustrative purposes only, the stations 314-1 and 314-2 are part of the VLAN 316-1 and the station 314-3 is part of the VLAN 316-2. In the example of FIG. 3B, the AP 312 switches traffic from VLAN 316-1 locally, if possible, and passes traffic from VLAN 316-2 upstream for upstream switching.

Figure 3C:
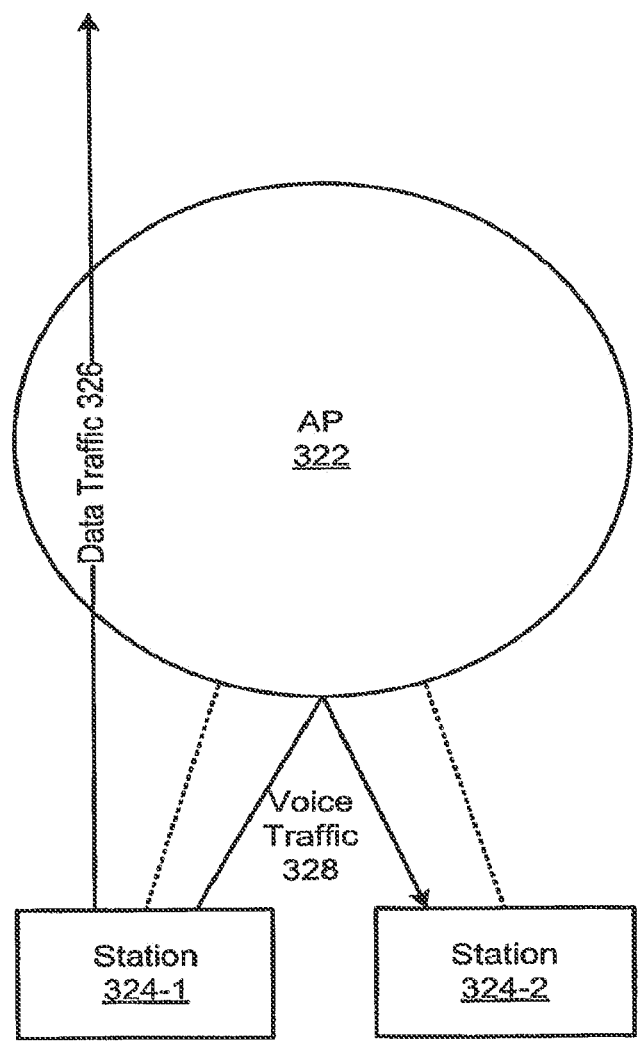

FIG. 3C depicts an example of a system 300C performing AP-local dynamic switching per class. The system 300C includes an AP 322 and stations 324-1 to 324-2 (referred to collectively as the stations 324). For illustrative purposes only, the station 324-1 sends data traffic 326 and voice traffic 328 to the station 324-2. In the example of FIG. 3C, the AP 322 switches voice traffic 328 locally, if possible, and passes data traffic 326 upstream for upstream switching. Advantageously, this may enable faster transmission times for voice traffic, which tends to be more time-sensitive than data traffic, while maintaining centralized control of data traffic.

Figure 3D:
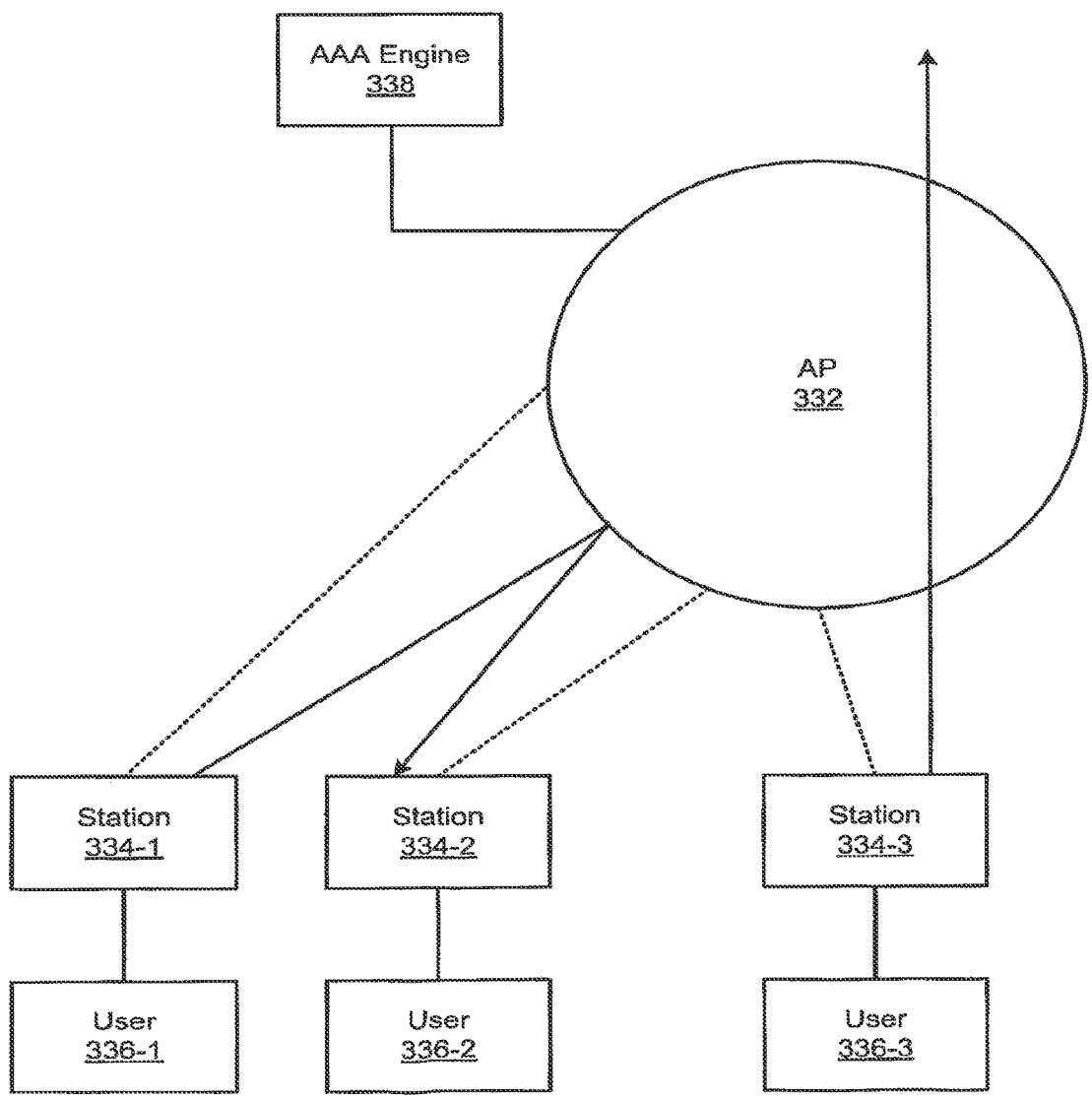

FIG. 3D depicts an example of a system 300D performing AP-local dynamic switching per user. The system 300D includes an AP 332 and stations 334-1 to 334-2 (referred to collectively as the stations 334). Each of the stations 334 has a respective associated user 336-1 to 336-3 (referred to collectively as the users 336). The users 336 and an AAA engine 338 are depicted for illustrative purposes only, to represent AP-local dynamic switching based on user authentication (e.g., AAA-driven switching). In the example of FIG. 3D, the AP 332 switches traffic from the station 334-1 locally, if possible, because the user 336-1 is allowed to do AP-local switching. However, the AP 332 passes traffic from the station 334-3 upstream for upstream switching because the user 336-3 is not allowed to do AP-local switching. Advantageously, this may enable faster transmission times for certain users, while maintaining centralized control of other users. By way of example but not limitation, the users allowed to do AP-local switching could be employees, while those not allowed to do AP-local switching could be guests. As another example, the users allowed to do AP-local switching could be employees of a first company, while those not allowed to do AP-local switching could be employees of a second company where the first company has superior (or at least different) access rights.

The examples of FIGS. 3A to 3D are intended to provide only a subset of the possible techniques for implementing AP-local dynamic switching. The techniques, whether illustrated in FIGS. 3A to 3D or not, could be used alone or in combination with other techniques, whether illustrated in FIGS. 3A to 3D or not.

Figure 4:
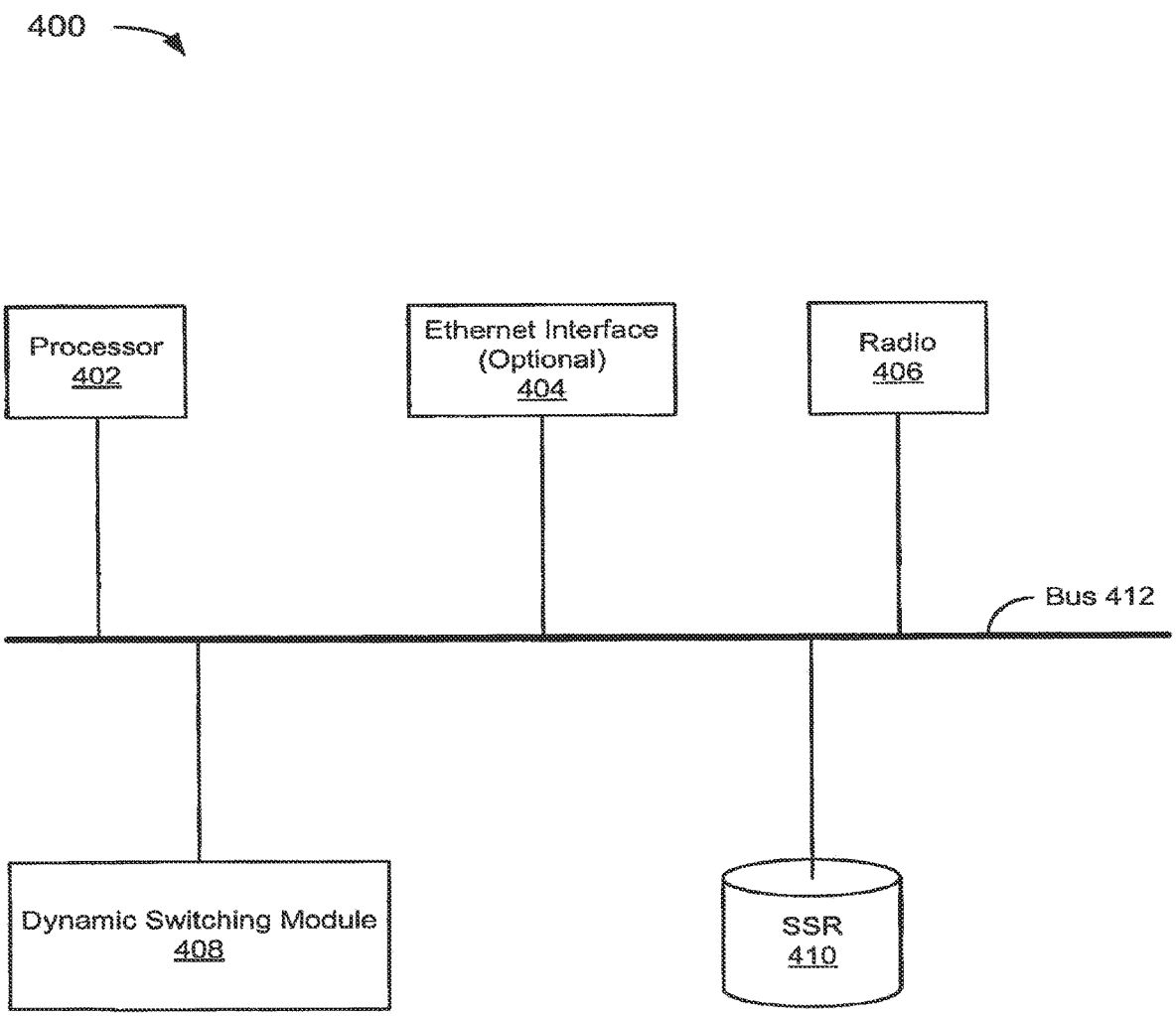
FIG. 4 depicts an example of an AP capable of AP-local dynamic switching.

FIG. 4 depicts an example of an AP 400 capable of AP-local dynamic switching. The AP 400 includes a processor 402, an optional Ethernet interface 404, a radio 406, a dynamic switching module 408, and a station switching record (SSR) database 410 coupled together via a bus 412. It may be noted that the various components could be coupled via some means other than the bus 412 without deviating from the scope of the teachings provided herein. The Ethernet interface 404 is optional because, for example, the AP 400 does not use Ethernet, the AP is a UAP that does not have a wired interface, or for some other reason. The radio may be an 802.11 radio, or some other wireless radio.

In an illustrative embodiment, the dynamic switching module 408 is implemented in a computer-readable medium, such as non-volatile storage and/or memory. The SSR database 410 is also implemented in a computer-readable medium, such as non-volatile storage and/or memory. In operation, portions of the dynamic switching module 408 maybe loaded from non-volatile storage into memory, and executed by the processor 402. In an alternative embodiment, the dynamic switching module 408 may have a dedicated processor (not shown). Whether the processor is shared or dedicated, the dynamic switching module 408 and the processor may be referred to collectively as a dynamic switching engine.

In the example of FIG. 4, in operation, the AP 400 receives from an upstream switch an SSR associated with a downstream station. The SSR is stored in the SSR database 410. The downstream station may be operationally connected to the AP 400 through a wireless link, either directly or indirectly through intervening nodes of a wireless mesh. The dynamic switching engine uses the SSR to determine whether to perform AP-local switching for traffic received from the downstream station at the AP 400, or to send the traffic upstream toward the upstream switch.

Figure 5:
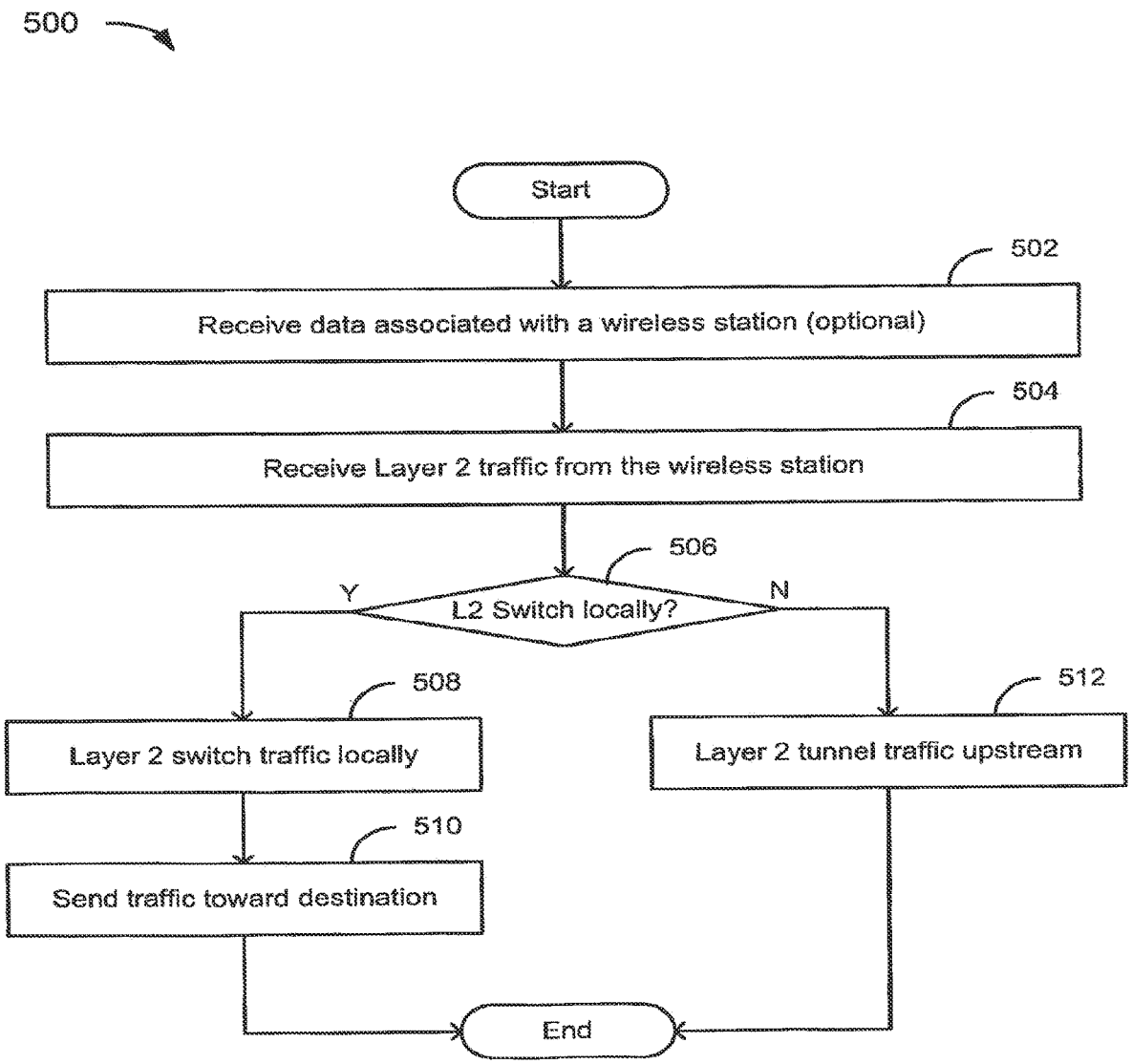
FIG. 5 depicts a flowchart of an example of a method for AP-local dynamic switching.

FIG. 5 depicts a flowchart 500 of an example of a method for AP-local dynamic switching. In the example of FIG. 5, the flowchart 500 starts at optional module 502 where data associated with a wireless station is received. The data may be received at, for example, an AP. The module 502 is optional because instead (or in addition), it may be possible to use data associated with traffic to make determinations regarding whether to AP-locally switch the traffic, as is described shortly.

In the example of FIG. 5, the flowchart 500 continues to module 504 where Layer 2 traffic is received from the wireless station. Advantageously, since the traffic is Layer 2, the system may operate using any Layer 3 protocols (e.g., IP), or even multiple Layer 3 protocols.

In the example of FIG. 5, the flowchart 500 continues to decision point 506 where it is determined whether to Layer 2 switch the traffic locally. The determination as to whether to switch the traffic locally may be made using data associated with the wireless station (see, e.g., module 502) or data associated with the traffic itself. For example, the wireless station may be authorized for AP-local switching because the wireless station is associated with a particular VLAN. As a second example, the traffic may have a relatively high priority, such as voice traffic often has. If the traffic has a relatively high priority, the determination may be made to switch locally to get the traffic to its destination more quickly. It may be noted that in the second example, the module 502 is optional.

In the example of FIG. 5, if it is determined that the traffic is to be Layer 2 switched locally (506-Y), the flowchart 500 continues to module 508 where the traffic is Layer 2 switched locally, and to module 510 where the traffic is sent toward its destination. Having switched and sent the traffic, the flowchart 500 ends.

In the example of FIG. 5, if it is determined that the traffic is not to be Layer 2 switched locally (506-N), the flowchart 500 continues to module 512 where the traffic is Layer 2 tunneled upstream. Presumably, the traffic is switched further upstream. Having Layer 2 tunneled traffic upstream that is not to be switched locally, the flowchart 500 ends.

As used herein, an AP may refer to a standard (tethered) AP or to a UAP. Where a distinction should be drawn, an AP may be referred to as a "(tethered) AP" or a "UAP," as appropriate. As used herein, the term "embodiment" means an embodiment that serves to illustrate by way of example but not limitation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
a memory;
one or more processors in communication with the memory and configured to:
receive a data signal from a first wireless station;
determine, based on whether the data signal includes time-sensitive traffic, whether to locally switch the data signal to a second wireless station or tunnel the data signal to an upstream switch via Layer 2 tunneling;
when the data signal is determined to include time-sensitive traffic, locally switch the data signal by the device to the second wireless station via Layer 2 switching; and
when the data signal is determined to include traffic that is not time-sensitive, tunnel the data signal by the device to the upstream switch via Layer 2 tunneling for switching to the second wireless station at the upstream switch.

2. The device of claim 1, wherein the time-sensitive traffic has a higher priority for data transmission than the traffic that is not time-sensitive.

3. The device of claim 1, wherein to determine whether to locally switch the data signal to the second wireless station or tunnel the data signal to the upstream switch via Layer 2 tunneling is based on a station switching record including data associated with the first wireless station.

4. The device of claim 3, wherein the one or more processors are further configured to receive the station switching record from an upstream source.

5. The device of claim 1, wherein to locally switch the data signal to the second wireless station is via an Ethernet interface.

6. The device of claim 1, wherein the second wireless station is an upstream destination.

7. The device of claim 1, wherein the device comprises an access point.

8. The device of claim 1, wherein the second wireless station is a downstream destination.

9. A method, comprising:
receiving, at an access point (AP), a data signal from a first wireless station;
determining, based on whether the data signal includes time-sensitive traffic, whether to locally switch the data signal to a second wireless station or tunnel the data signal to an upstream switch via Layer 2 tunneling;
when the data signal is determined to include time-sensitive traffic, locally switching the data signal by the AP to the second wireless station via Layer 2 switching; and
when the data signal is determined to include traffic that is not time-sensitive, tunneling the data signal by the AP to the upstream switch via Layer 2 tunneling for switching to the second wireless station at the upstream switch.

10. The method of claim 9, wherein the time-sensitive traffic has a higher priority for data transmission than the traffic that is not time-sensitive.

11. The method of claim 9, wherein the determining is based on a station switching record (SSR) including data associated with the first wireless station.

12. The method of claim 9, further comprising:
receiving a station switching record (SSR) from an upstream source,
wherein the determining is based on data in the SSR associated with the first wireless station.

13. The method of claim 9, wherein locally switching the data signal to the second wireless station is via an Ethernet interface.

14. The method of claim 9, wherein the second wireless station is an upstream destination.

15. The method of claim 9, wherein the second wireless station is a downstream destination.

16. A device comprising:
a memory;
one or more processors in communication with the memory and configured to:
receive a data signal from a first wireless station, the data signal including traffic associated with a user;
determine, based on whether the data signal includes traffic associated with a user with access rights, whether to locally switch the data signal to a second wireless station or tunnel the data signal to an upstream switch via Layer 2 tunneling;
when the user has access rights, locally switch the data signal to the second wireless station via Layer 2 switching; and
when the user does not have access rights, tunnel the data signal to the upstream switch via Layer 2 tunneling for switching to the second wireless station at the upstream switch.

17. The device of claim 16, wherein to determine whether to locally switch the data signal to the second wireless station or tunnel the data signal to the upstream switch via Layer 2 tunneling is based on authentication data associated with the user.

18. The device of claim 17, wherein the one or more processors are further configured to receive the authentication data from an upstream source.

19. The device of claim 16, wherein to locally switch the data signal to the second wireless station is via an Ethernet interface.

20. The device of claim 16, wherein the device comprises an access point.

* * * * *